United States Patent
Ihara et al.

(10) Patent No.: US 10,665,903 B2
(45) Date of Patent: *May 26, 2020

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Murata Manufacturing Co., Ltd., Kyoto (JP)

(72) Inventors: Masayuki Ihara, Fukushima (JP); Shigeru Fujita, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 222 days.

This patent is subject to a terminal disclaimer.

(21) Appl. No.: 15/543,144

(22) PCT Filed: Jan. 26, 2016

(86) PCT No.: PCT/JP2016/052119
§ 371 (c)(1),
(2) Date: Jul. 12, 2017

(87) PCT Pub. No.: WO2016/129384
PCT Pub. Date: Aug. 18, 2016

(65) Prior Publication Data
US 2017/0365884 A1    Dec. 21, 2017

(30) Foreign Application Priority Data
Feb. 13, 2015    (JP) .................................. 2015-026729

(51) Int. Cl.
*H01M 10/42* (2006.01)
*H01M 10/0525* (2010.01)
(Continued)

(52) U.S. Cl.
CPC ........... *H01M 10/4235* (2013.01); *B25F 5/02* (2013.01); *B60L 58/10* (2019.02); *H01M 2/02* (2013.01);
(Continued)

(58) Field of Classification Search
None
See application file for complete search history.

(56) References Cited

U.S. PATENT DOCUMENTS

2010/0099018 A1  4/2010  Kawase et al.
2010/0124706 A1  5/2010  Hirose et al.
(Continued)

FOREIGN PATENT DOCUMENTS

CN    102969531       3/2013
CN    103531845    *  1/2014
(Continued)

OTHER PUBLICATIONS

Espacenet Abstract of CN103531845. Li et al. China. Jan. 22, 2014. (Year: 2014).*
(Continued)

*Primary Examiner* — Christopher P Domone
(74) *Attorney, Agent, or Firm* — K&L Gates LLP

(57) ABSTRACT

A secondary battery includes: a cathode, an anode, and an electrolytic solution including a sulfuric acid compound represented by $X^{n+}[M(Rf)_a(CN)_b(SO_4)_c]^{m-}$, where $X^{n+}$ is an ion such as a metal ion, M is an element such as a transition metal element, Rf is a group such as a fluorine group, a is an integer of 0 to 4, b is an integer of 0 to 5, c is an integer of 1 to 4, m is an integer of 1 to 3, and n is an integer of 1 or 2. The cathode, the anode, and the electrolytic solution are provided inside a film-like outer package member.

23 Claims, 7 Drawing Sheets

(51) Int. Cl.

| | | |
|---|---|---|
| *H01M 10/0567* | (2010.01) | |
| *H01M 10/0568* | (2010.01) | |
| *H01M 10/48* | (2006.01) | |
| *B25F 5/02* | (2006.01) | |
| *H01M 10/0569* | (2010.01) | |
| *H02J 7/00* | (2006.01) | |
| *H01M 2/02* | (2006.01) | |
| *B60L 58/10* | (2019.01) | |

(52) U.S. Cl.
CPC ... *H01M 10/0525* (2013.01); *H01M 10/0567* (2013.01); *H01M 10/0568* (2013.01); *H01M 10/0569* (2013.01); *H01M 10/425* (2013.01); *H01M 10/48* (2013.01); *H02J 7/0063* (2013.01); *H01M 2010/4271* (2013.01); *H01M 2300/004* (2013.01); *H01M 2300/0034* (2013.01); *H02J 2007/0067* (2013.01)

(56) References Cited

U.S. PATENT DOCUMENTS

| | | | |
|---|---|---|---|
| 2012/0244410 A1* | 9/2012 | Kawashima | H01M 4/485 429/144 |
| 2012/0326500 A1* | 12/2012 | Hirose | H01M 4/5825 307/9.1 |
| 2013/0093392 A1 | 4/2013 | Odani et al. | |
| 2016/0027592 A1* | 1/2016 | Shimamoto | H01G 11/58 429/332 |

FOREIGN PATENT DOCUMENTS

| | | |
|---|---|---|
| CN | 103531845 A | 1/2014 |
| CN | 107004905 | 8/2017 |
| JP | 2010-097756 A | 4/2010 |
| JP | 2010-118287 A | 5/2010 |
| JP | 2010-123265 A | 6/2010 |
| JP | 2013-225388 A | 10/2013 |
| JP | 2014199792 | 10/2014 |
| WO | 2014/163055 A1 | 10/2014 |

OTHER PUBLICATIONS

English translation of CN 103531845. Li et al. China. Jan. 22, 2014 (Year: 2014).*
Chinese Office Action dated Jun. 5, 2019 in corresponding Chinese Application No. 201680009012.8.
International Search Report issued in connection with International Patent Application No. PCT/JP2016/052119, dated Apr. 26, 2016. (5 pages).
Written Opinion of the International Searching Authority issued in connection with International Patent Application No. PCT/JP2016/052119, dated Apr. 26, 2016. (9 pages).
International Preliminary Report on Patentability issued in connection with International Patent Application No. PCT/JP2016/052119, dated Aug. 15, 2017. (5 pages).
European Office Action dated Jun. 1, 2018 in corresponding European Application No. 16749029.1.
Li Shiyou, et al., "Lithium difluoro (sulfato) borate as a novel electrolyte salt for high-temperature lithium-ion batteries", Electrochimica Acta, vol. 129, pp. 327-333, XP028638930, ISSN: 0013-4686, DOI: 10.1016/J. ELECTACTA.2014.02.090.
Li Shiyou et al: "Compatibilty of lithium difluoro (sulfato) borate-based electrolyte for LiMn2O4cathode", Applied Surface Science, Elsevier, Amsterdam, NL, vol. 330, Jan. 14, 2015 (Jan. 14, 2015), pp. 316-320, XP029201001, ISSN: 0169-4332, DOI: 10.1016/J. APSUSC.2015.01.044.
Chinese Office Action dated Jan. 25, 2019 in corresponding Chinese Application No. 201680009012.8.
Chinese Office Action dated Oct. 12, 2019 in corresponding Chinese Application No. 201680009012.8.

* cited by examiner

[FIG. 1]
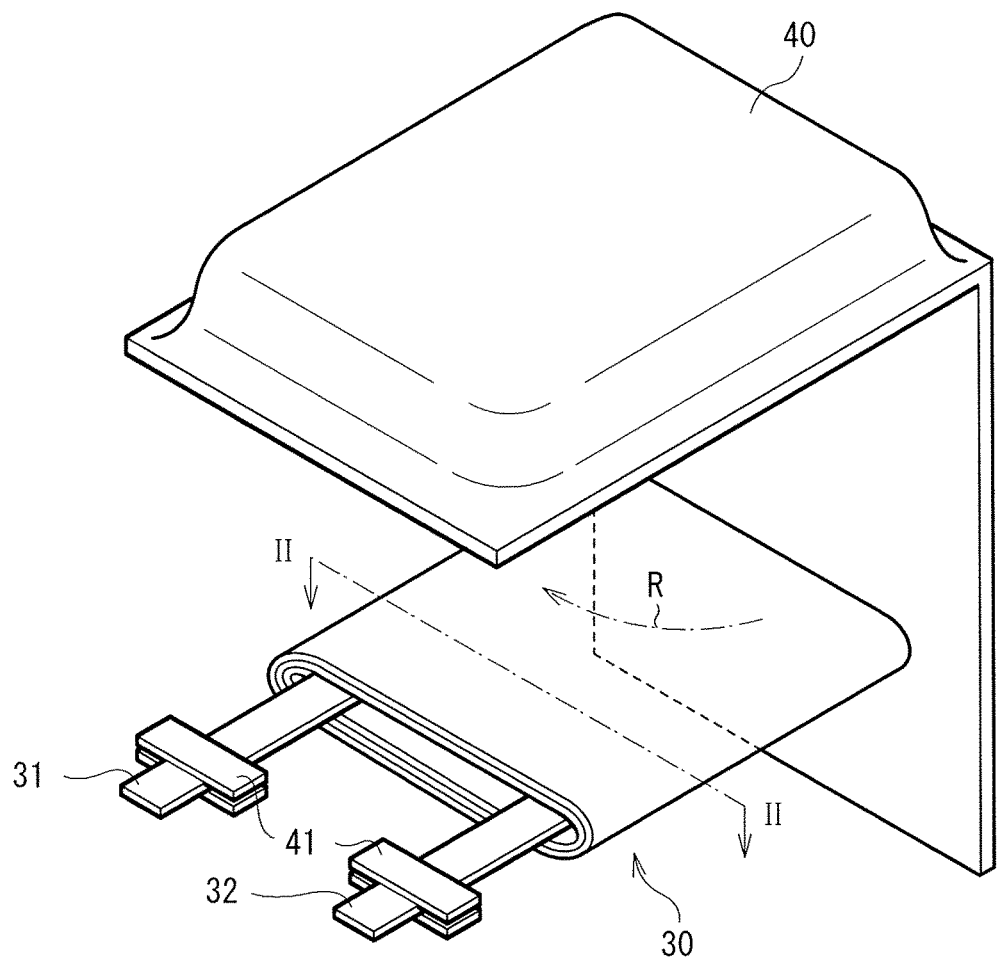

[ FIG. 2 ]
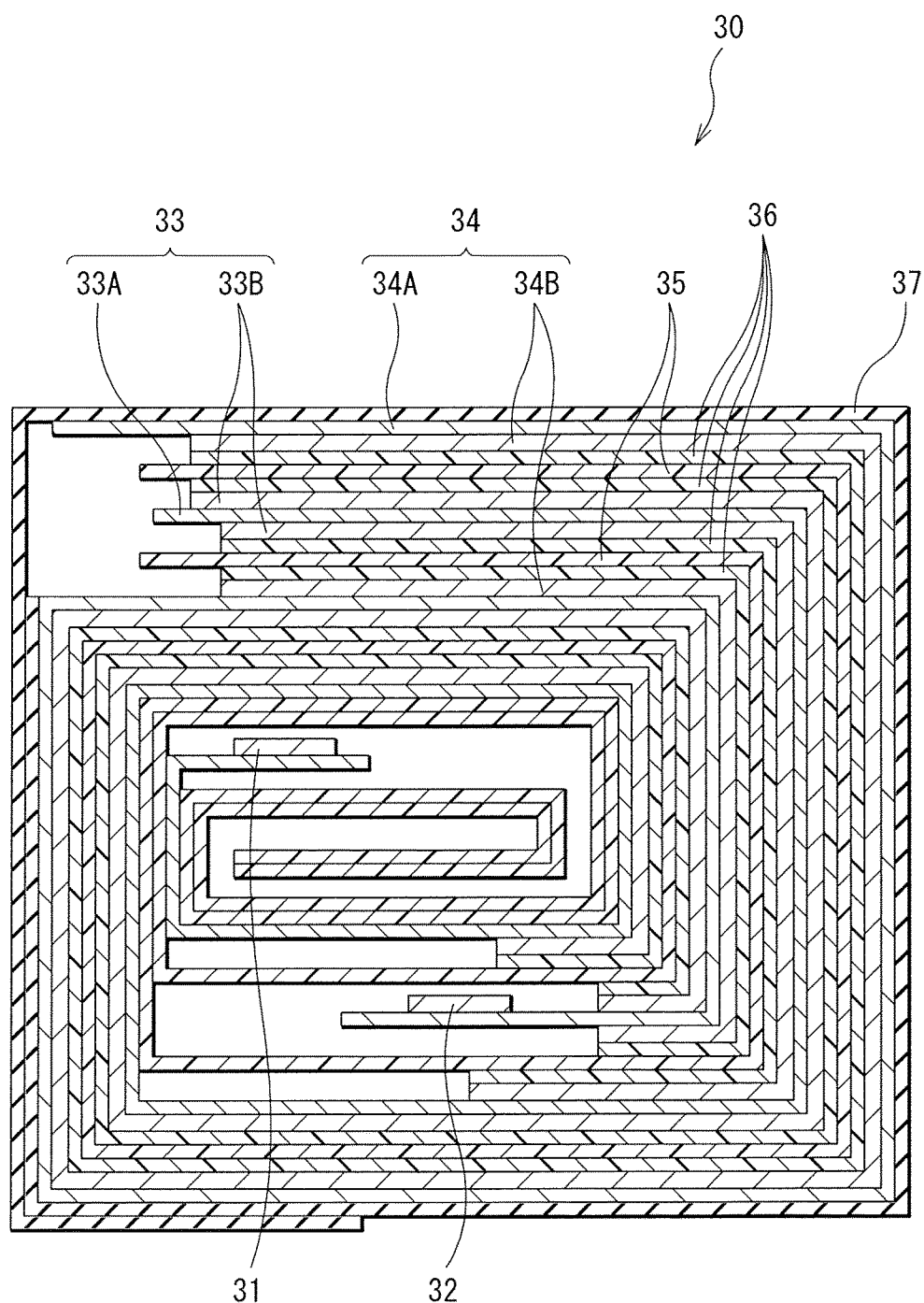

[ FIG. 3 ]
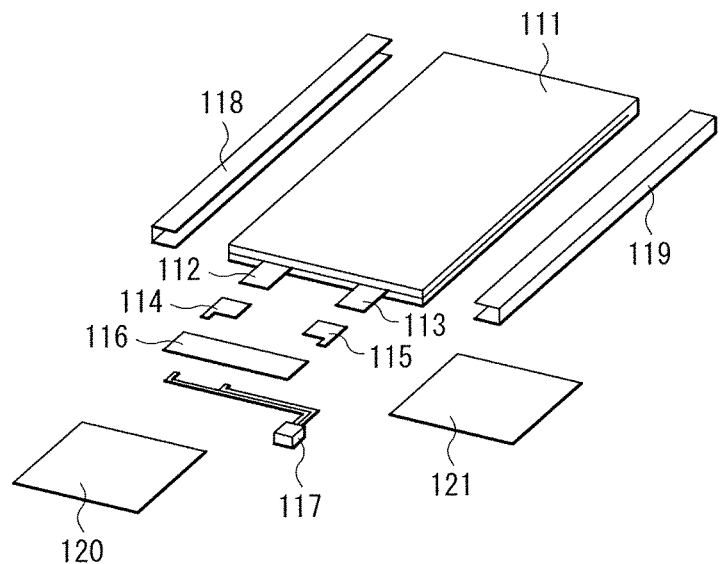
[ FIG. 4 ]
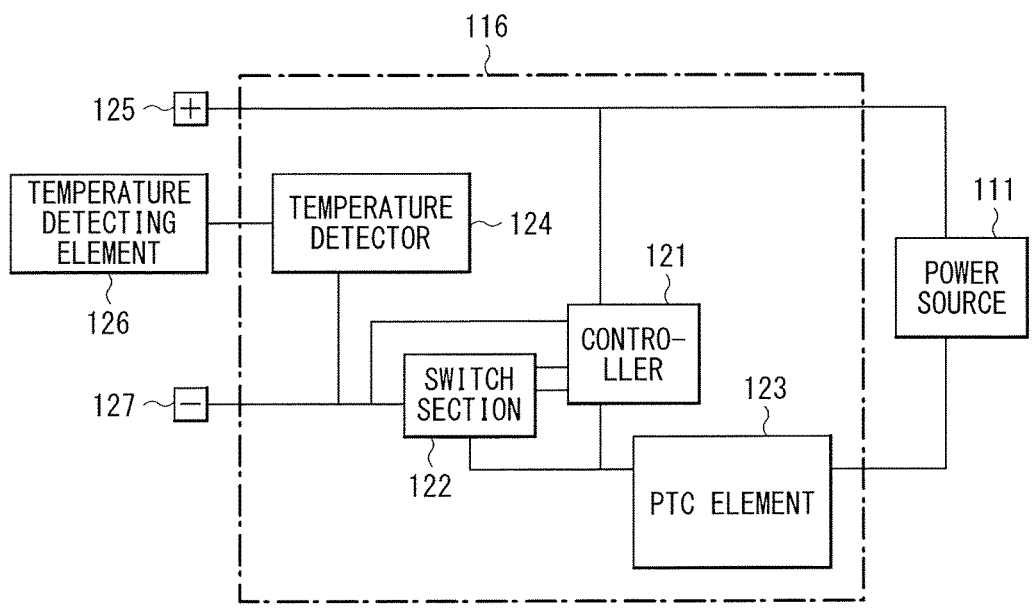

[ FIG. 5 ]
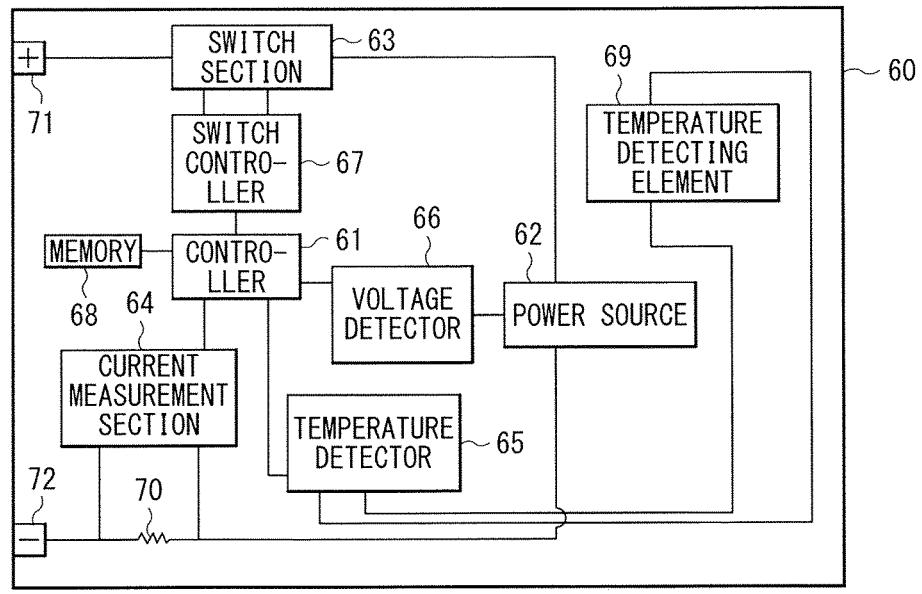
[ FIG. 6 ]
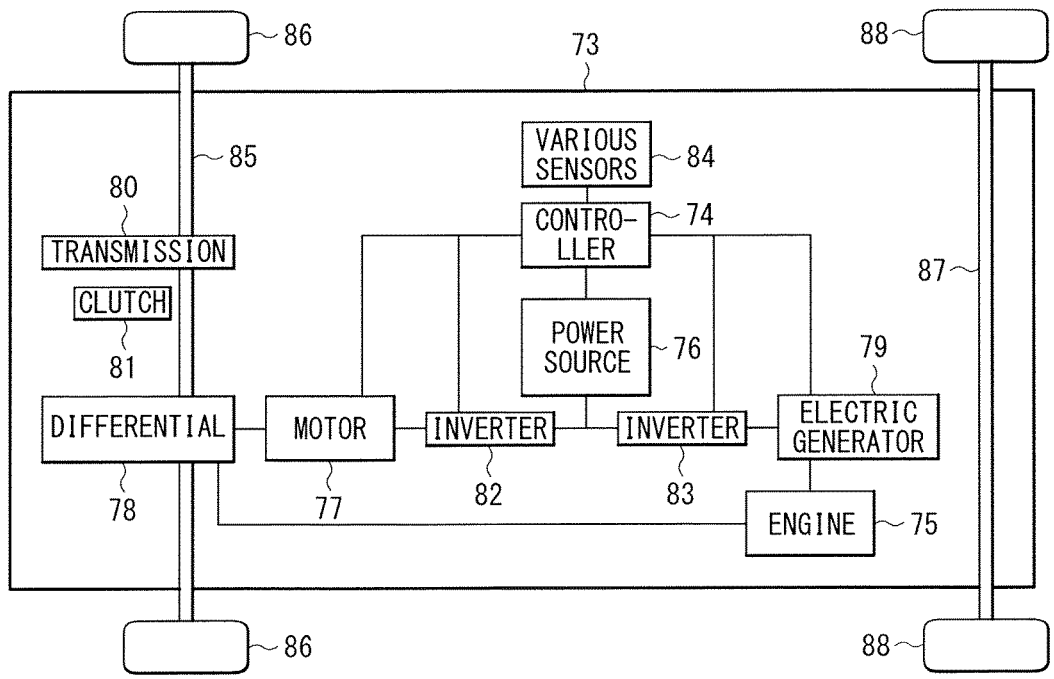

[ FIG. 7 ]
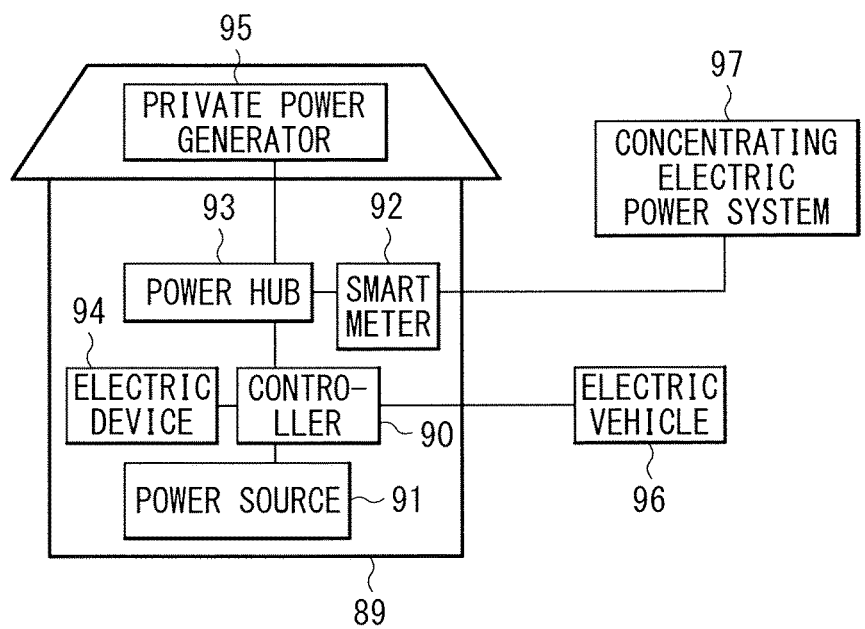
[ FIG. 8 ]
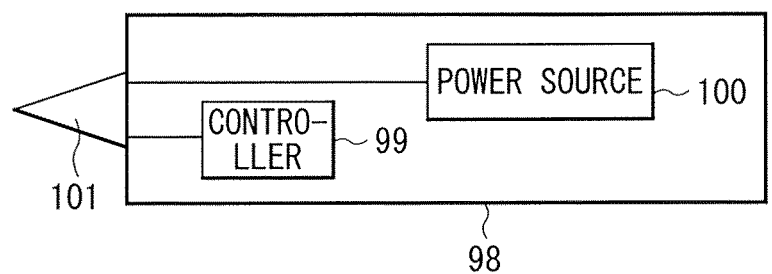

[ FIG. 9 ]
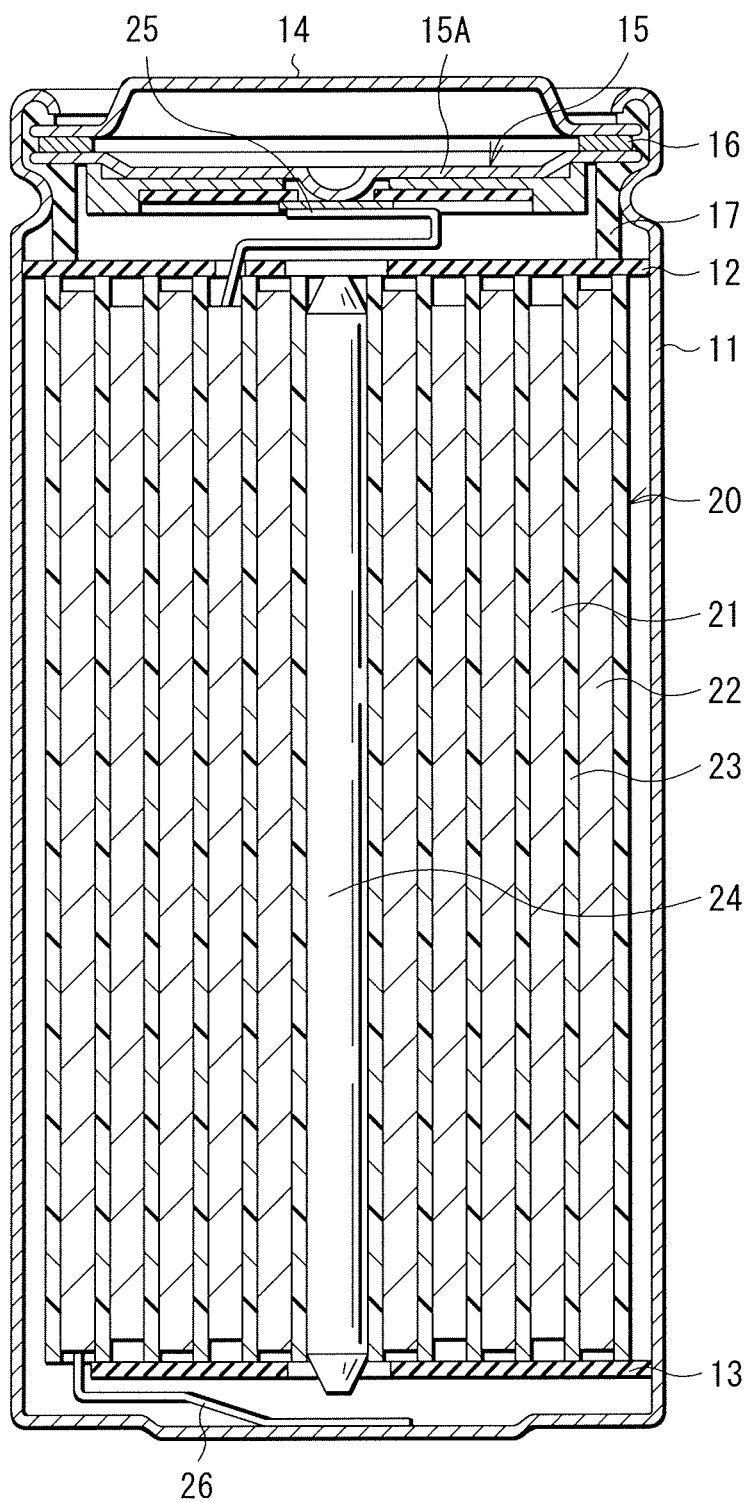

[ FIG. 10 ]
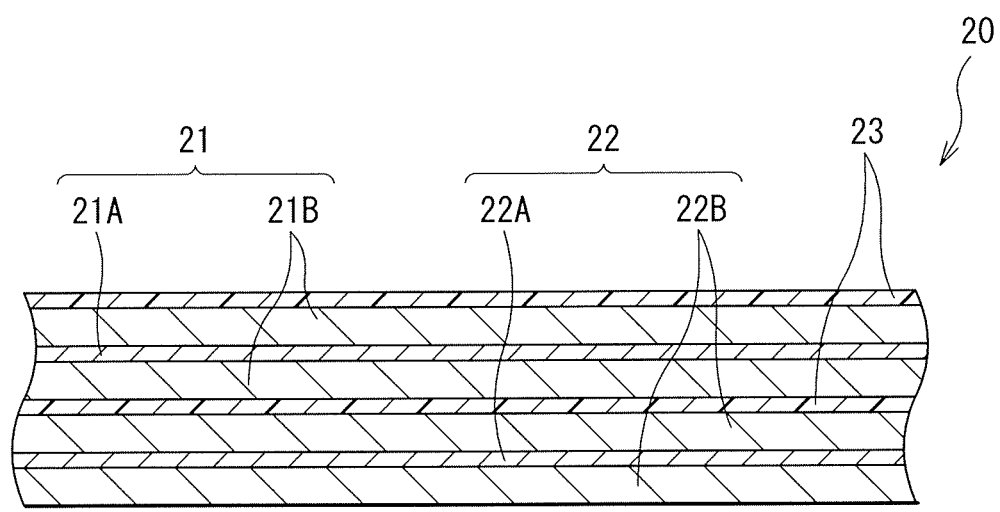

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS-REFERENCE TO RELATED APPLICATIONS

The present application claims the benefit of International Application No. PCT/JP2016/052119, filed Jan. 26, 2016, which claims priority to Japanese Application No. 2015-026729, filed Feb. 13, 2015, the disclosures of which are incorporated herein by reference.

BACKGROUND

The present technology relates to a secondary battery that includes a cathode, an anode, and an electrolytic solution, and a battery pack, an electric vehicle, an electric power storage system, an electric power tool, and an electronic apparatus each of which uses the secondary battery.

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and lightweight secondary batteries that have ability to achieve high energy density have been developed as power sources for the electronic apparatuses.

Applications of the secondary batteries are not limited to the electronic apparatuses described above, and it has been also considered to apply the secondary batteries to various other applications. Examples of such other applications include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant and a secondary battery that utilizes precipitation and dissolution of an electrode reactant, which make it possible to achieve higher energy density than other batteries such as a lead-acid battery and a nickel-cadmium battery.

The secondary battery includes a cathode, an anode, and electrolytic solution. The electrolytic solution includes an electrolyte salt and any other material. The composition of the electrolytic solution exerts a large influence on battery characteristics. Accordingly, various studies have been conducted on the composition of the electrolytic solution.

More specifically, in order to improve cycle characteristics and other characteristics, $LiBF_2SO_4$ is used as an electrolyte salt (for example, refer to PTL 1).

CITATION LIST

Patent Literature

PTL 1: Chinese Patent Application Publication No. 103531845

SUMMARY

In association with higher performance and more multi-functionality of electronic apparatuses and other apparatuses described above, the electronic apparatuses and the other apparatuses are more frequently used, and usage environment thereof expands. For this reason, there is still room for improvement in battery characteristics of the secondary batteries.

It is therefore desirable to provide a secondary battery, a battery pack, an electric vehicle, an electric power storage system, an electric power tool, and an electronic apparatus each of which makes it possible to achieve superior battery characteristics.

A secondary battery according to an embodiment of the present technology includes: a cathode; an anode; and an electrolytic solution including a sulfuric acid compound represented by the following formula (1), the cathode, the anode, and the electrolytic solution being provided inside a film-like outer package member.

$$X^{n+}[M(Rf)_a(CN)_b(SO_4)_c]^{m-} \qquad (1)$$

where $X^{n+}$ is one of a metal ion and an onium ion, M is one of transition metal elements, and Group 13 elements, Group 14 elements, and Group 15 elements in the long form of the periodic table of the elements, Rf is one of a fluorine group (—F) and a monovalent fluorinated hydrocarbon group, a is an integer of 0 to 4, b is an integer of 0 to 5, c is an integer of 1 to 4, m is an integer of 1 to 3, and n is an integer of 1 or 2.

A battery pack, an electric vehicle, an electric power storage system, an electric power tool, and an electronic apparatus according to respective embodiments of the present technology each include a secondary battery, and the secondary battery has a configuration similar to that of the foregoing secondary battery according to the embodiment of the present technology.

According to the secondary battery of the embodiment of the present technology, the electrolytic solution is provided inside the film-like outer package member, and includes the foregoing sulfuric acid compound, which makes it possible to achieve superior battery characteristics. Moreover, in each of the battery pack, the electric vehicle, the electric power storage system, the electric power tool, and the electronic apparatus of the respective embodiments of the present technology, similar effects are achievable.

Note that effects described here are non-limiting. Effects achieved by the present technology may be one or more of effects described in the present technology.

BRIEF DESCRIPTION OF THE DRAWINGS

FIG. 1 is a perspective view of a configuration of a secondary battery (laminated film type) according to an embodiment of the present technology.

FIG. 2 is a cross-sectional view taken along a line II-II of a spirally wound electrode body illustrated in FIG. 1.

FIG. 3 is a perspective view of a configuration of an application example (a battery pack: single battery) of the secondary battery.

FIG. 4 is a block diagram illustrating a configuration of the battery pack illustrated in FIG. 3.

FIG. 5 is a block diagram illustrating a configuration of an application example (a battery pack: assembled battery) of the secondary battery.

FIG. 6 is a block diagram illustrating a configuration of an application example (an electric vehicle) of the secondary battery.

FIG. 7 is a block diagram illustrating a configuration of an application example (an electric power storage system) of the secondary battery.

FIG. 8 is a block diagram illustrating a configuration of an application example (an electric power tool) of the secondary battery.

FIG. 9 is a cross-sectional view of a configuration of a secondary battery (cylindrical type) of a comparative example.

FIG. 10 is a cross-sectional view of part of a spirally wound electrode body illustrated in FIG. 9.

DETAILED DESCRIPTION

In the following, some embodiments of the present technology are described in detail with reference to the drawings. It is to be noted that description is given in the following order.

1. Secondary Battery
  1-1. Lithium-Ion Secondary Battery (Laminated Film Type)
  1-2. Lithium Metal Secondary Battery (Laminated Film Type)
2. Applications of Secondary Battery
  2-1. Battery Pack (Single Battery)
  2-2. Battery Pack (Assembled Battery)
  2-3. Electric Vehicle
  2-4. Electric Power Storage System
  2-5. Electric Power Tool <1. Secondary Battery>

First, description is given of a secondary battery according to an embodiment of the present technology.

<1-1. Lithium-Ion Secondary Battery (Laminated Film Type)>

FIG. 1 illustrates a perspective configuration of the secondary battery, and FIG. 2 illustrates a cross-sectional configuration taken along a line II-II of a spirally wound electrode body 30 illustrated in FIG. 1. It is to be noted that FIG. 1 illustrates a state in which the spirally wound electrode body 30 and an outer package member 40 are separated from each other.

The secondary battery described here is, for example, a lithium-ion secondary battery in which a capacity of an anode 34 is obtained by insertion and extraction of lithium as an electrode reactant.

[Whole Configuration of Secondary Battery]

In the secondary battery, for example, the spirally wound electrode body 30 as a battery element is contained inside the film-like outer package member 40, as illustrated in FIG. 1. A battery structure using the film-like outer package member 40 is of a so-called laminated film type. In the spirally wound electrode body 30, for example, a cathode 33 and an anode 34 are stacked with a separator 35 and an electrolyte layer 36 in between, and then the cathode 33, the anode 34, the separator 35, and the electrolyte layer 36 are spirally wound. The electrolyte layer 36 contains an electrolytic solution. A cathode lead 31 is attached to the cathode 33, and an anode lead 32 is attached to the anode 34. An outermost periphery of the spirally wound electrode body 30 is protected by a protective tape 37.

The cathode lead 31 is led out, for example, from inside to outside of the outer package member 40. The anode lead 32 is led out, for example, from inside to outside of the outer package member 40 in the same direction as that of the cathode lead 31. The cathode lead 31 includes, for example, one or more of conductive materials such as aluminum (Al). The anode lead 32 includes, for example, one or more of conductive materials such as copper (Cu), nickel (Ni), and stainless steel. These conductive materials have, for example, one or more of types such as a thin-plate shape and a mesh shape.

The outer package member 40 is, for example, one film that is foldable in a direction of an arrow R illustrated in FIG. 1, and the outer package member 40 has a depression for containing of the spirally wound electrode body 30 in part thereof. The outer package member 40 is, for example, a laminated film in which a fusion bonding layer, a metal layer, and a surface protective layer are laminated in this order. In a process of manufacturing the secondary battery, the outer package member 40 is folded so that portions of the fusion-bonding layer face each other with the spirally wound electrode body 30 in between, and thereafter outer edges of the portions of the fusion bonding layer are fusion-bonded. Alternatively, the outer package member 40 may be film configured of two laminated films bonded to each other by, for example, an adhesive. Examples of the fusion bonding layer include a film made of one or more of polyethylene, polypropylene, and other materials. The metal layer includes, for example, one or more of an aluminum foil and other metal materials. The surface protective layer is, for example, a film made of one or more of nylon, polyethylene terephthalate, and other materials.

In particular, the outer package member 40 is preferably an aluminum laminated film in which a polyethylene film, an aluminum foil, and a nylon film are laminated in this order. However, the outer package member 40 may be a laminated film having any other laminated structure, a polymer film such as polypropylene, or a metal film.

For example, an adhesive film 41 for prevention of outside air intrusion is inserted between the outer package member 40 and the cathode lead 31. Moreover, for example, the foregoing adhesive film 41 is inserted between the outer package member 40 and the anode lead 32. The adhesive film 41 includes a material having adhesibility with respect to both the cathode lead 31 and the anode lead 32. Examples of the material having adhesibility include a polyolefin resin. More specific examples thereof include one or more of polyethylene, polypropylene, modified polyethylene, and modified polypropylene.

[Cathode]

The cathode 33 includes, for example, a cathode current collector 33A and cathode active material layers 33B provided on both surfaces of the cathode current collector 33A, as illustrated in FIG. 2. Alternatively, the cathode active material layer 33B may be provided on a single surface of the cathode current collector 33A.

The cathode current collector 33A includes, for example, one or more of conductive materials. The kind of the conductive material is not particularly limited, but is, for example, a metal material such as aluminum (Al), nickel (Ni), and stainless steel. The cathode current collector 21A may be configured of a single layer or may be configured of multiple layers.

The cathode active material layer 33B contains, as a cathode active material, one or more of cathode materials that have ability to insert and extract lithium. It is to be noted that the cathode active material layer 33B may further contain one or more of other materials such as a cathode binder and a cathode conductor.

The cathode material is preferably a lithium-containing compound. More specifically, the cathode material is preferably one or more of lithium-containing composite oxides and lithium-containing phosphate compounds, which make it possible to achieve high energy density.

The lithium-containing composite oxide is an oxide that contains lithium and one or more elements that exclude lithium (hereinafter, referred to as "other elements") as constituent elements, and has, for example, one of crystal structures such as a layered rock-salt crystal structure and a spinel crystal structure. The lithium-containing phosphate compound is a phosphate compound that contains lithium and one or more of the other elements as constituent elements, and has, for example, a crystal structure such as an olivine crystal structure.

The kinds of the other elements are not particularly limited, as long as the other elements are one or more of any elements. In particular, the other elements are preferably one or more of elements that belongs to Groups 2 to 15 in the long form of the periodic table of the elements. More specifically, the other elements are more preferably one or more of nickel (Ni), cobalt (Co), manganese (Mn), and iron (Fe), which make it possible to obtain a high voltage.

Examples of the lithium-containing composite oxide having the layered rock-salt crystal structure include compounds represented by the following formulas (21), (22), and (23).

$$Li_aMn_{(1-b-c)}Ni_bM11_cO_{(2-d)}F_e \tag{21}$$

where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \le a \le 1.2$, $0 < b < 0.5$, $0 \le c \le 0.5$, $(b+c) < 1$, $-0.1 \le d \le 0.2$, and $0 \le e \le 0.1$, it is to be noted that the composition of lithium varies depending on charge and discharge states, and "a" is a value in a completely-discharged state.

$$Li_aNi_{(1-b)}M12_bO_{(2-c)}F_d \tag{22}$$

(where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0.005 \le b \le 0.5$, $-0.1 \le c \le 0.2$, and $0 \le d \le 0.1$, it is to be noted that the composition of lithium varies depending on charge and discharge states, and "a" is a value in a completely-discharged state.

$$Li_aCO_{(1-b)}M13_bO_{(2-c)}F_d \tag{23}$$

where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0 \le b < 0.5$, $-0.1 \le c \le 0.2$, and $0 \le d \le 0.1$, it is to be noted that the composition of lithium varies depending on charge and discharge states, and "a" is a value in a completely-discharged state.

Specific examples of the lithium-containing composite oxide having the layered rock-salt crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It is to be noted that in a case where the lithium-containing composite oxide having the layered rock-salt crystal structure includes nickel, cobalt, manganese, and aluminum as constituent elements, an atomic ratio of nickel is preferably 50 at % or more, which makes it possible to achieve high energy density.

Examples of the lithium-containing composite oxide having the spinel crystal structure include a compound represented by the following formula (24).

$$Li_aMn_{(2-b)}M14_bO_cF_d \tag{24}$$

where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \le a \le 1.1$, $0 \le b \le 0.6$, $3.7 \le c \le 4.1$, and $0 \le d \le 0.1$, it is to be noted that the composition of lithium varies depending on charge and discharge states, and "a" is a value in a completely-discharged state.

Specific examples of the lithium-containing composite oxide having the spinel crystal structure include $LiMn_2O_4$.

Examples of the lithium-containing phosphate compound having the olivine crystal structure include a compound represented by the following formula (25).

$$Li_aM15PO_4 \tag{25}$$

where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \le a \le 1.1$, it is to be noted that the composition of lithium varies depending on charge and discharge states, and "a" is a value in a completely-discharged state.

Specific examples of the lithium-containing phosphate compound having the olivine crystal structure include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, a compound represented by the following formula (26).

$$(Li_2MnO_3)_x(LiMnO_2)_{1-x} \tag{26}$$

where "x" satisfies $0 \le x \le 1$, it is to be noted that the composition of lithium varies depending on charge and discharge states, and "x" is a value in a completely-discharged state.

In addition, the cathode material may be, for example, one or more of an oxide, a disulfide, a chalcogenide, and a conductive polymer. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene. It is to be noted that the cathode material may be any material other than the materials mentioned above.

The cathode binder contains one or more of, for example, synthetic rubbers and polymer materials. Examples of the synthetic rubbers include a styrene-butadiene-based rubber, a fluorine-based rubber, and ethylene propylene diene. Examples of the polymer materials include polyvinylidene fluoride and polyimide.

The cathode conductor contains one or more of, for example, carbon materials. Examples of the carbon materials include graphite, carbon black, acetylene black, and Ketjen black. Alternatively, the cathode conductor may be any other material such as a metal material and a conductive polymer, as long as the cathode conductor is a material having conductivity.

[Anode]

The anode 34 includes, for example, an anode current collector 34A and anode active material layers 34B provided on both surfaces of the anode current collector 34A, as illustrated in FIG. 2. Alternatively, the anode active material layer 34B may be provided on a single surface of the anode current collector 34A.

The anode current collector 34A includes, for example, one or more of conductive materials. The kind of the conductive material is not particularly limited, but is, for example, a metal material such as copper (Cu), aluminum (Al), nickel (Ni), and stainless steel. The anode current collector 34A may be configured of a single layer or may be configured of multiple layers.

A surface of the anode current collector 34A is preferably roughened. This makes it possible to improve adhesibility of the anode active material layer 34B with respect to the anode current collector 34A by a so-called anchor effect. In this case, it may be only necessary to roughen the surface of the anode current collector 34A at least in a region facing the anode active material layer 34B. Examples of a roughening method include a method of forming fine particles with use of electrolytic treatment. Through the electrolytic treatment, fine particles are formed on the surface of the anode current collector 34A in an electrolytic bath by an electrolytic method to make the surface of the anode current collector 34A rough. A copper foil fabricated by the electrolytic method is generally called "electrolytic copper foil".

The anode active material layer 34B contains, as an anode active material, one or more of anode materials that have ability to insert and extract lithium. It is to be noted that the anode active material layer 34B may further contain one or more of other materials such as an anode binder and an anode conductor.

In order to prevent lithium metal from being unintentionally precipitated on the anode 34 in the middle of charge, chargeable capacity of the anode material is preferably larger than discharge capacity of the cathode 33. In other words, electrochemical equivalent of the anode material that has ability to insert and extract lithium is preferably larger than electrochemical equivalent of the cathode 33.

The anode material is, for example, one or more of carbon materials. The carbon material causes an extremely-small change in a crystal structure thereof during insertion and extraction of lithium, which stably achieves high energy density. Further, the carbon material also serves as the anode conductor, which improves conductivity of the anode active material layer 34B.

Examples of the carbon material include graphitizable carbon, nongraphitizable carbon, and graphite. A spacing of (002) plane in the nongraphitizable carbon is preferably 0.37 nm or larger, and a spacing of (002) plane in the graphite is preferably 0.34 nm or smaller. More specific examples of the carbon material include pyrolytic carbons, cokes, glassy carbon fibers, an organic polymer compound fired body, activated carbon, and carbon blacks. Examples of the cokes include pitch coke, needle coke, and petroleum coke. The organic polymer compound fired body is a polymer compound fired (carbonized) at an appropriate temperature. Examples of the polymer compound include phenol resin and furan resin. Other than the materials mentioned above, the carbon material may be low crystalline carbon that is subjected to heat treatment at a temperature of about 1000° C. or lower, or may be amorphous carbon. It is to be noted that a shape of the carbon material may be one or more of a fibrous shape, a spherical shape, a granular shape, and a scale-like shape.

Moreover, the anode material is, for example, a material (a metal-based material) that contains one or more of metal elements and metalloid elements as constituent elements. This makes it possible to achieve high energy density.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain one or more of nonmetallic elements. Examples of a structure of the metal-based material include a solid solution, a eutectic crystal (a eutectic mixture), an intermetallic compound, and a structure in which two or more thereof coexist.

The metal elements and the metalloid elements mentioned above are, for example, one or more of metal elements and metalloid elements that are able to form an alloy with lithium. Specific examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both are preferable. Silicon and tin have superior ability to insert and extract lithium, and achieve remarkably high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The simple substance described here merely refers to a simple substance in a general sense (in which a small amount of impurity may be contained), and does not necessarily refer to a simple substance having a purity of 100%.

The alloy of silicon contains, for example, one or more of elements such as tin, nickel, copper, iron, cobalt, manganese, zinc, indium, silver, titanium, germanium, bismuth, antimony, and chromium, as constituent elements other than silicon. The compound of silicon contains, for example, one or more of elements such as carbon and oxygen, as constituent elements other than silicon. It is to be noted that the compound of silicon may contain, for example, one or more of the elements described related to the alloy of silicon, as constituent elements other than silicon.

Specific examples of the alloy of silicon and the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. It is to be noted that "v" in $SiO_v$ may be, for example, in a range of $0.2<v<1.4$.

The alloy of tin contains, for example, one or more of elements such as silicon, nickel, copper, iron, cobalt, manganese, zinc, indium, silver, titanium, germanium, bismuth, antimony, and chromium, as constituent elements other than tin. The compound of tin contains, for example, one or more of elements such as carbon and oxygen, as constituent elements other than tin. It is to be noted that the compound of tin may contain, for example, one or more of the elements described related to the alloy of tin, as constituent elements other than tin.

Specific examples of the alloy of tin and the compound of tin include $SnO_w$ ($0<w\leq2$), $SnSiO_3$, LiSnO, and $Mg_2Sn$.

In particular, the material that contains tin as a constituent element is preferably, for example, a material (a Sn-containing material) that contains, together with tin as a first constituent element, a second constituent element and a third constituent element. The second constituent element includes, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element includes, for example, one or more of elements such as boron, carbon, aluminum, and phosphorus (P). The Sn-containing material containing the second constituent element and the third constituent element makes it possible to achieve, for example, high battery capacity and superior cycle characteristics.

In particular, the Sn-containing material is preferably a material (a SnCoC-containing material) that contains tin, cobalt, and carbon as constituent elements. In the SnCoC-containing material, for example, a content of carbon is from 9.9 mass % to 29.7 mass %, and a ratio of contents of tin and cobalt (Co/(Sn+Co)) is from 20 mass % to 70 mass % both inclusive. This makes it possible to achieve high energy density.

The SnCoC-containing material preferably has a phase that contains tin, cobalt, and carbon. Such a phase is preferably low crystalline or amorphous. This phase is a reaction phase that is able to react with lithium. Hence, existence of the reaction phase results in achievement of superior characteristics. A half width (a diffraction angle $2\theta$) of a diffraction peak obtained by X-ray diffraction of this reaction phase is preferably 1° or larger in a case where a CuK$\alpha$ ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of $2\theta$ that is from 20° to 50° both inclusive. Such a reaction phase includes, for example, the respective constituent elements mentioned above, and it is considered that such a reaction phase has become low crystalline or amorphous mainly because of existence of carbon.

In the SnCoC-containing material, part or all of carbon that is the constituent element thereof is preferably bound to one of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-K$\alpha$ ray or a Mg-K$\alpha$ ray is used as a soft X-ray. In a case where part or all of carbon is bound to one of the metal element and the metalloid element, a peak of a synthetic wave of 1s orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks are therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain one or more of, for example, silicon, iron, nickel, chromium, indium, niobium, germanium, titanium, molybdenum, aluminum, phosphorus, gallium, and bismuth, as constituent elements.

Other than the SnCoC-containing material, a material (a SnCoFeC-containing material) that contains tin, cobalt, iron, and carbon as constituent elements is also preferable. Any composition of the SnCoFeC-containing material is adopted. To give an example, in a case where a content of iron is set smaller, a content of carbon is from 9.9 mass % to 29.7 mass % both inclusive, a content of iron is from 0.3 mass % to 5.9 mass % both inclusive, and a ratio of contents of tin and cobalt (Co/(Sn+Co)) is from 30 mass % to 70 mass % both inclusive. Alternatively, in a case where the content of iron is set larger, the content of carbon is from 11.9 mass % to 29.7 mass % both inclusive, the ratio of contents of tin, cobalt, and iron ((Co+Fe)/(Sn+Co+Fe)) is from 26.4 mass % to 48.5 mass % both inclusive, and the ratio of contents of cobalt and iron (Co/(Co+Fe)) is from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be one or more of, for example, a metal oxide and a polymer compound. Examples of the metal oxide include iron oxide, ruthenium oxide, and molybdenum oxide. Examples of the polymer compound include polyacetylene, polyaniline, and polypyrrole.

In particular, the anode material preferably contains both the carbon material and the metal-based material for the following reason.

The metal-based material, in particular, the material containing one or both of silicon and tin as constituent elements has a concern that such a material is easily and radically expanded or contracted during charge and discharge, whereas such a material has an advantage of high theoretical capacity. In contrast, the carbon material has an advantage that the carbon material is less prone to be expanded or contracted during charge and discharge, whereas the carbon material has a concern of low theoretical capacity. Hence, using both of the carbon material and the metal-based material makes it possible to suppress expansion and contraction during charge and discharge while achieving high theoretical capacity (in other words, high battery capacity).

The anode active material layer 22B is formed by, for example, one or more of a coating method, a vapor-phase method, a liquid-phase method, a spraying method, and a firing method (sintering method). The coating method is, for example, a method in which, after a particulate (powder) anode active material is mixed with, for example, an anode binder, the mixture is dispersed in, for example, an organic solvent, and the resultant is applied onto the anode current collector 34A. Examples of the vapor-phase method include a physical deposition method and a chemical deposition method. More specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method and an electroless plating method. The spraying method is a method in which an anode active material in a fused state or a semi-fused state is sprayed to the anode current collector 34A. The firing method is, for example, a method in which, after the mixture dispersed in, for example, an organic solvent is applied onto the anode current collector 22A by the coating method, the resultant is subjected to heat treatment at a temperature higher than a melting point of, for example, the anode binder. As the firing method, for example, one or more of firing methods such as an atmosphere firing method, a reactive firing method, and a hot press firing method are employed.

In the secondary battery, as described above, in order to prevent lithium from being unintentionally precipitated on the anode 34 in the middle of charge, the electrochemical equivalent of the anode material that has ability to insert and extract lithium is larger than the electrochemical equivalent of the cathode. Moreover, in a case where an open circuit voltage (that is, a battery voltage) in a completely-charged state is 4.25 V or higher, an extraction amount of lithium per unit mass is larger than that in a case where the open circuit voltage is 4.20 V, even if the same cathode active material is used. Hence, amounts of the cathode active material and the anode active material are adjusted in accordance therewith. As a result, high energy density is achieved.

[Separator]

For example, the separator 35 is provided between the cathode 33 and the anode 34, as illustrated in FIG. 2. The separator 35 separates the cathode 33 from the anode 34, and passes lithium ions therethrough while preventing current short circuit that results from contact between the cathode 33 and the anode 34.

The separator 35 is, for example, one or more of porous films such as porous films of a synthetic resin and ceramics. The separator 35 may be a laminated film in which two or more porous films are laminated. Examples of the synthetic resin include polytetrafluoroethylene, polypropylene, and polyethylene.

In particular, the separator 35 may include, for example, the foregoing porous film (a base layer) and a polymer compound layer provided on a single surface or both surfaces of the base layer. This makes it possible to improve adhesibility of the separator 35 with respect to each of the cathode 33 and the anode 34, thereby suppressing deformation of the spirally wound electrode body 30. This makes it possible to suppress decomposition reaction of the electrolytic solution and to suppress liquid leakage of the electrolytic solution with which the base layer is impregnated. Accordingly, even if charge and discharge are repeated, resistance is less prone to increase, and battery swollenness is suppressed.

The polymer compound layer contains, for example, a polymer material such as polyvinylidene fluoride, which has high physical strength and is electrochemically stable. The polymer material may be any material other than polyvinylidene fluoride. In order to form the polymer compound layer, for example, the base layer is coated with a solution prepared by dissolving the polymer material in, for example, an organic solvent, and thereafter, the base layer is dried. Alternatively, the base layer may be immersed in the solution, and thereafter the base layer may be dried.

[Electrolyte Layer]

The electrolyte layer 36 includes an electrolytic solution and a polymer compound. The electrolyte layer 36 described here is a so-called gel electrolyte, and the electrolytic solution is held by the polymer compound. The gel electrolyte achieves high ionic conductivity (for example, 1 mS/cm or more at room temperature), and prevents liquid leakage of the electrolytic solution. It is to be noted that the electrolyte layer 36 may further include one or more of other materials such as an additive.

The polymer material contains, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly (methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer is, for example, a copolymer of vinylidene fluoride and hexafluoropropylene. In particular, polyvinylidene fluoride is preferable as a homopolymer, and a copolymer of vinylidene fluoride and hexafluoropropylene is preferable as a copolymer. Such polymer compounds are electrochemically stable.

The electrolytic solution includes one or more sulfuric acid compounds represented by the following formula (1). The sulfuric acid compounds may also serve as, for example, part of an electrolyte salt to be described later in the electrolytic solution.

$$X^{n+}[M(Rf)_a(CN)_b(SO_4)_c]^{m-} \tag{1}$$

where $X^{n+}$ is one of a metal ion and an onium ion, M is one of transition metal elements, and Group 13 elements, Group 14 elements, and Group 15 elements in the long form of the periodic table of the elements, Rf is one of a fluorine group (—F) and a monovalent fluorinated hydrocarbon group, a is an integer of 0 to 4, b is an integer of 0 to 5, c is an integer of 1 to 4, m is an integer of 1 to 3, and n is an integer of 1 or 2.

The sulfuric acid compound includes a cation ($X^{n+}$) and an anion ($[M(Rf)_a(CN)_b(SO_4)_c]^{m-}$), and in the anion, a fluorine-containing group (—Rf), a cyano group (—CN), and a sulfuric acid group (>SO_4) are bound to a central atom (M). The "fluorine-containing group" means a group containing fluorine (F) as a constituent element.

In the laminated film type secondary battery, the cathode 33, the anode 34, and the electrolyte layer 36 are contained inside the film-like outer package member 40. In this case, the electrolytic solution includes the sulfuric acid compound, which improves chemical stability of the electrolytic solution, thereby suppressing decomposition reaction of the electrolytic solution during charge and discharge. Accordingly, even in the laminated film type secondary battery of which swollenness is easily visible, the secondary battery is resistant to swelling. Moreover, even if charge and discharge are repeated, discharge capacity is less prone to decrease. These advantages are remarkable specifically in a hostile environment such as a high-temperature environment and a low-temperature environment.

The kind of the cation ($X^{n+}$) is not particularly limited, as long as the cation is one of the metal ion and the onium ion.

The kind of the metal ion is not particularly limited, as long as the metal ion is any of ions of metal elements. In particular, the metal element is preferably one of Group 1 elements (alkali metal elements) and Group 2 elements (alkaline-earth metal elements) in the long form of the periodic table of the elements, which easily make the sulfuric acid compound available (manufacturable) and sufficiently improve chemical stability of the electrolytic solution.

Examples of the alkali metal elements include lithium (Li), sodium (Na), potassium (K), rubidium (Rb), cesium (Cs), and francium (Fr). Examples of the alkaline-earth metal elements include beryllium (Be), magnesium (Mg), calcium (Ca), strontium (Sr), barium (Ba), and radium (Ra).

The kind of the onium ion is not particularly limited, as long as the onium ion is any of cations obtained by protonation. Examples of the onium ion include an ammonium ion ($NH_4^+$), a phosphonium ion ($PH_4^+$), an oxonium ion ($H_3O^+$), a sulfonium ion ($H_3S^+$), a fluoronium ion ($H_2F^+$), and a chloronium ion ($H_2Cl^+$).

In particular, X is preferably lithium, which makes it possible to achieve a higher effect.

The kind of the central atom (M) is not particularly limited, as long as the central atom is one of the transition metal elements, and the Group 13 elements, the Group 14 elements, and the Group 15 elements in the long form of the periodic table of the elements.

Examples of the Group 13 elements include boron (B), aluminum (Al), gallium (Ga), indium (In), and thallium (Tl). Examples of the Group 14 elements include carbon (C), silicon (Si), germanium (Ge), tin (Sn), and lead (Pb). Examples of the Group 15 elements include nitrogen (N), phosphorus (P), arsenic (As), antimony (Sb), and bismuth (Bi).

In particular, the central atom is preferably one of elements such as boron, phosphorus, and aluminum, which easily make the sulfuric acid compound available (manufacturable) and sufficiently improve chemical stability of the electrolytic solution.

The kind of the fluorine-containing group (—Rf) is not particularly limited, as long as the fluorine-containing group is one of the fluorine group and the monovalent fluorinated hydrocarbon group. In a case where the number of the fluorine-containing groups (the value of a) is two or more, the two or more fluorine-containing groups may be groups of a same kind or groups of different kinds. It goes without saying that some of the two or more fluorine-containing groups may be groups of a same kind.

As can be seen from a range of values that a possibly takes (a=an integer of 0 to 4), the sulfuric acid compound may include the fluorine-containing group or may not include the fluorine-containing group. Similarly, as can be seen from a range of values that b possibly takes (b=an integer of 0 to 5), the sulfuric acid compound may include the cyano group or may not include the cyano group.

In contrast, as can be seen from a range of values that c possibly takes (c=an integer of 1 to 4), the sulfuric acid compound includes one or more sulfate groups, which sufficiently improve chemical stability of the electrolytic solution.

The monovalent fluorinated hydrocarbon group is a group in which one or more hydrogen groups (—H) in the monovalent hydrocarbon group are substituted by a fluorine group (—F). The monovalent hydrocarbon group is a generic name of a monovalent group configured of carbon (C) and hydrogen (H).

It is to be noted that the monovalent hydrocarbon group may have a straight-chain structure or a branched structure with one or more side chains. Moreover, the monovalent hydrocarbon group may be an unsaturated hydrocarbon group including a carbon-carbon multiple bond or a saturated hydrocarbon group not including a carbon-carbon multiple bond. Examples of the carbon-carbon multiple bond include a carbon-carbon double bond (>C=C<) and a carbon-carbon triple bond (—C≡C—).

Examples of the monovalent hydrocarbon group include an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound (hereinafter referred to as "monovalent binding group"). Examples of the monovalent binding group include a group in which the alkyl group and the alkenyl group are bound, a group in which the alkyl group and the alkynyl group are bound, and a group in which the alkenyl group and the alkynyl group are bound. Moreover, examples of the monovalent binding group include a group in which the cycloalkyl group and one of the alkyl group, the alkenyl group, and the alkynyl group are bound, and a group in which the aryl group and one of the alkyl group, the alkenyl group, and the alkynyl group are bound.

It is to be noted that the number of carbons in the monovalent hydrocarbon group is not particularly limited. The number of carbons in the alkyl group is, for example, from 1 to 10. The number of carbons in the alkenyl group and the number of carbons in the alkynyl group each are, for example, from 2 to 10. The number of carbons in the cycloalkyl group and the number of carbons in the aryl group each are, for example, from 6 to 18. This makes it possible to sufficiently improve chemical stability of the electrolytic solution while securing solubility, compatibility, and other properties of the sulfuric acid compound.

Specific examples of the alkyl group include a methyl group (—$CH_3$), an ethyl group (—$C_2H_5$), a propyl group (—$C_3H_7$), and a t-butyl group (—C(—$CH_3$)$_2$—$CH_3$). Specific examples of the alkenyl group include a vinyl group (—CH=$CH_2$) and an allyl group (—$CH_2$—CH=$CH_2$). Specific examples of the alkynyl group include an ethynyl group (—C≡CH). Specific examples of the cycloalkyl group include a cyclopropyl group, a cyclobutyl group, a cyclopentyl group, a cyclohexyl group, a cycloheptyl group, and a cyclooctyl group. Specific examples of the aryl group include a phenyl group and a naphthyl group. Specific examples of the monovalent binding group include a benzyl group.

In particular, the fluorine-containing group is preferably a monovalent fluorinated hydrocarbon group, and more preferably a group (a fluorinated alkyl group) in which one or more hydrogen groups in the alkyl group are substituted by a fluorine group. Moreover, the number of carbons in the monovalent fluorinated hydrocarbon group is preferably from 1 to 10, as described above, which sufficiently improves chemical stability of the electrolytic solution while securing solubility, compatibility, and other properties of the sulfuric acid compound.

Specific examples of the monovalent fluorinated hydrocarbon group include a group in which one or more hydrogen groups in each of the specific examples of the alkyl group, the specific examples of the alkenyl group, the specific examples of the alkynyl group, the specific examples of the cycloalkyl group, the specific examples of the aryl group, the specific examples of the monovalent binding group mentioned above are substituted by a fluorine group.

Specific examples of the fluorinated alkyl group include a perfluoromethyl group (—$CF_3$), a perfluoroethyl group (—$C_2F_5$), a perfluoropropyl group (—$C_3F_7$), and a perfluoro-t-butyl group (—C(—$CF_3$)$_2$—$CF_3$).

Specific examples of the sulfuric acid compound include the following compounds.

Specific examples of the sulfuric acid compound in which the central atom is boron include $LiBF_2SO_4$, $LiBF(CN)SO_4$, $LiB(CN)_2SO_4$, $LiBF(CF_3)SO_4$, $LiBF(C_2F_5)SO_4$, $LiB(CF_3)(CN)SO_4$, $LiB(C_2F_5)(CN)SO_4$, $LiB(CF_3)_2SO_4$, $LiB(C_2F_5)_2SO_4$, and $LiB(SO_4)_2$.

Specific examples of the sulfuric acid compound in which the central atom is phosphorus include $LiPF_4SO_4$, $LiP(CF_3)_4SO_4$, $LiP(C_2F_5)_4SO_4$, $LiPF_2(SO_4)_2$, $LiP(CN)_4SO_4$, $LiPF_2(CN)_2SO_4$, and $LiP(SO_4)_3$.

Specific examples of the sulfuric acid compound in which the central atom is aluminum include $LiAlF_2SO_4$, $LiAlF(CN)SO_4$, $LiAlF(CF_3)SO_4$, and $LiAl(SO_4)_2$.

A content of the sulfuric acid compound in the electrolytic solution is not particularly limited, but is preferably from 0.01 mol/kg to 1 mol/kg both inclusive, which sufficiently improves chemical stability of the electrolytic solution.

It is to be noted that the electrolytic solution may further include one or more other materials.

The other materials include, for example, one or more of solvents such as a nonaqueous solvent (an organic solvent). An electrolytic solution including the nonaqueous solvent is a so-called nonaqueous electrolytic solution.

Examples of the solvents include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Examples of the cyclic carbonate ester include ethylene carbonate, propylene carbonate, and butylene carbonate. Examples of the chain carbonate ester include dimethyl carbonate, diethyl carbonate, ethylmethyl carbonate, and methylpropyl carbonate. Examples of the lactone include γ-butyrolactone and γ-valerolactone. Examples of the chain carboxylate ester include methyl acetate, ethyl acetate, methyl propionate, ethyl propionate, propyl propionate, methyl butyrate, methyl isobutyrate, methyl trimethylacetate, and ethyl trimethylacetate. Examples of the nitrile include acetonitrile, methoxyacetonitrile, and 3-methoxypropionitrile.

In addition, examples of the solvents include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyl oxazolidinone, N,N'-dimethyl imidazolidinone, nitromethane, nitroethane, sulfolane, trimethyl phosphate, and dimethyl sulfoxide, which make it possible to achieve a similar advantage.

In particular, one or more of ethylene carbonate, propylene carbonate, dimethyl carbonate, diethyl carbonate, and ethylmethyl carbonate are preferable, which make it possible to achieve, for example, higher battery capacity, superior cycle characteristics, and superior storage characteristics. In this case, a combination of a high-viscosity (high dielectric constant) solvent (having, for example, specific dielectric constant ε≥30) such as ethylene carbonate and propylene carbonate and a low-viscosity solvent (having, for example, viscosity≤1 mPa·s) such as dimethyl carbonate, ethylmethyl carbonate, and diethyl carbonate is more preferable. The combination allows for an improvement in the dissociation property of an electrolyte salt and ion mobility.

In particular, the solvent preferably contains one or more of unsaturated cyclic carbonate esters, which make it possible to remarkably improve chemical stability of the electrolytic solution by a synergistic effect of the sulfuric acid compound and the unsaturated cyclic carbonate ester.

The unsaturated cyclic carbonate ester is a cyclic carbonate ester having one or more unsaturated bonds (carbon-carbon double bonds). Examples of the unsaturated cyclic carbonate ester include compounds represented by the following formulas (1), (2), and (3). A content of the unsaturated cyclic carbonate ester in the solvent is not particularly limited, but is, for example, from 0.01 wt % to 10 wt % both inclusive.

[Chem. 1]

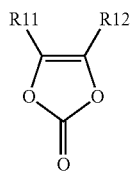

(1)

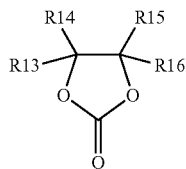

(2)

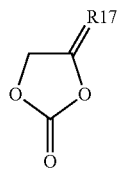

(3)

where each of R11 and R12 is one of a hydrogen group and an alkyl group, each of R13 to R16 is one of a hydrogen group, an alkyl group, a vinyl group, and an allyl group, one or more of R13 to R16 is one of the vinyl group and the allyl group, R17 is a group represented by >CR171R172, and each of R171 and R172 is one of a hydrogen group and an alkyl group.

The compound represented by the formula (1) is a vinylene carbonate-based compound. R11 and R12 may be groups of a same kind or groups of different kinds. Details of the alkyl group are as described above. Specific examples of the vinylene carbonate-based compound include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

The compound represented by the formula (2) is a vinyl ethylene carbonate-based compound. R13 to R16 may be groups of a same kind or groups of different kinds. It goes without saying that some of R13 to R16 may be groups of a same kind. Specific examples of the vinyl ethylene carbonate-based compound include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one.

The compound represented by the formula (3) is a methylene ethylene carbonate-based compound. R171 and R172 may be groups of a same kind or groups of different kinds. Specific examples of the methylene ethylene carbonate-based compound include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, the unsaturated cyclic carbonate ester may be a catechol carbonate having a benzene ring.

Moreover, the solvent preferably contains one or more of halogenated carbonate esters, which make it possible to remarkably improve chemical stability of the electrolytic solution by a synergistic effect of the sulfuric acid compound and the halogenated carbonate ester.

The halogenated carbonate ester is a cyclic or chain carbonate ester containing one or more halogens as constituent elements, and is, for example, a compound represented by one of the following formulas (4) and (5). A content of the halogenated carbonate ester in the solvent is not particularly limited, but is, for example, from 0.01 wt % to 50 wt % both inclusive.

[Chem. 2]

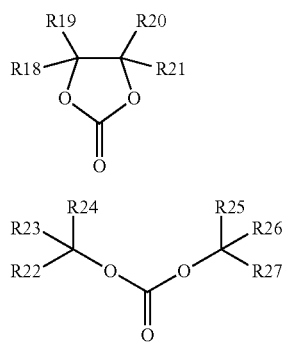

(4)

(5)

where each of R18 to R21 is one of a hydrogen group, a halogen group, an alkyl group, and a halogenated alkyl group, one or more of R18 to R21 is one of the halogen group and the halogenated alkyl group, each of R22 to R27 is one of a hydrogen group, a halogen group, an alkyl group, and a halogenated alkyl group, and one or more of R22 to R27 is one of the halogen group and the halogenated alkyl group.

The compound represented by the formula (4) is a cyclic halogenated carbonate ester. R18 to R21 may be groups of a same kind or groups of different kinds. It goes without saying that some of R18 to R21 may be groups of a same kind.

The kind of the halogen group is not particularly limited; however, in particular, one or more of a fluorine group, a chlorine group (—Cl), a bromine group (—Br) and a iodine group (—I) are preferable, and the fluorine group is more preferable. Moreover, the number of halogen groups is more preferably two than one, and may be three or more. This makes it possible to achieve a higher effect.

Details of the alkyl group are as described above. The halogenated alkyl group is a group in which one or more hydrogen groups in the alkyl group are substituted (halogenated) by a halogen group. Details of the halogen group are as described above.

Specific examples of the cyclic halogenated carbonate ester include compounds represented by the following formulas (4-1) to (4-21), which include geometric isomers. In particular, for example, 4-fluoro-1,3-dioxolane-2-one represented by the formula (4-1) and 4,5-difluoro-1,3-dioxolane-2-one represented by the formula (4-3) are preferable. It is to be noted that as 4,5-difluoro-1,3-dioxolane-2-one, a trans-isomer is more preferable than a cis-isomer, which is easily available and makes it possible to achieve a higher effect.

[Chem. 3]

(4-1)

(4-2)

(4-3)

(4-4)

(4-5)

(4-6)

(4-7)

-continued (4-8) 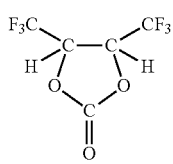

(4-9) 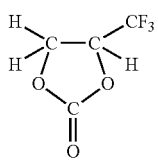

(4-10) 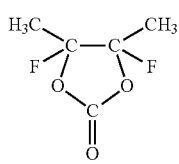

(4-11) 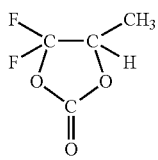

(4-12) 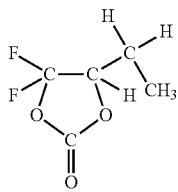

(4-13) 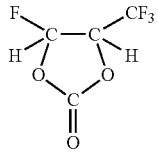

(4-14) 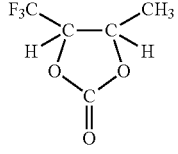

(4-15) 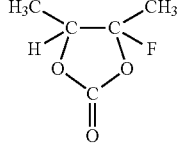

(4-16) 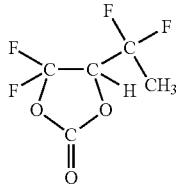

-continued (4-17)

(4-18)

(4-19)

(4-20)

(4-21)

The compound represented by the formula (5) is a halogenated chain carbonate ester. R22 to R27 may be groups of a same kind or groups of different kinds. It goes without saying that some of R22 to R27 may be groups of a same kind.

Specific examples of the halogenated chain carbonate ester include fluoromethyl methyl carbonate, bis(fluoromethyl) carbonate, and difluoromethyl methyl carbonate.

In addition, the solvent may contain one or more of a sulfonate ester, an acid anhydride, a dicyano compound (dinitrile), and a diisocyanate compound, which make it possible to improve chemical stability of the electrolytic solution.

Examples of the sulfonate ester include a monosulfonate ester and a disulfonate ester. A content of the sulfonate ester in the solvent is not particularly limited, but is, for example, from 0.5 wt % to 5 wt % both inclusive.

The monosulfonate ester may be a cyclic monosulfonate ester or a chain monosulfonate ester. Specific examples of the cyclic monosulfonate ester include sultone such as 1,3-propane sultone and 1,3-propene sultone. Specific examples of the chain monosulfonate ester include a compound in which a cyclic monosulfonate ester is cleaved at a middle site.

The disulfonate ester may be a cyclic disulfonate ester or a chain disulfonate ester. Specific examples of the cyclic disulfonate ester include compounds represented by formulas (6-1) to (6-3). Specific examples of the chain disulfonate ester include a compound in which a cyclic disulfonate ester is cleaved at a middle site.

[Chem. 4]

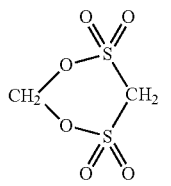

(6-1)

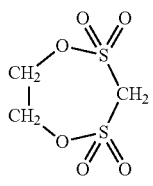

(6-2)

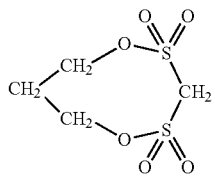

(6-3)

Examples of the acid anhydride include a carboxylic anhydride, a disulfonic anhydride, and a carboxylic-sulfonic anhydride. A content of the acid anhydride in the solvent is not particularly limited, but is, for example, from 0.5 wt % to 5 wt % both inclusive.

Specific examples of the carboxylic anhydride include succinic anhydride, glutaric anhydride, and maleic anhydride. Specific examples of the disulfonic anhydride include ethanedisulfonic anhydride and propanedisulfonic anhydride. Specific examples of a carboxylic-sulfonic anhydride include sulfobenzoic anhydride, sulfopropionic anhydride, and sulfobutyric anhydride.

Examples of the dicyano compound include a compound represented by NC—$C_mH_{2m}$—CN (where m is an integer of 1 or more). A content of the dicyano compound in the solvent is not particularly limited, but is, for example, from 0.5 wt % to 5 wt % both inclusive. Specific examples of the dicyano compound include succinonitrile (NC—$C_2H_4$—CN), glutaronitrile (NC—$C_3H_6$—CN), adiponitrile (NC—$C_4H_8$—CN), and phthalonitrile (NC—$C_6H_4$—CN).

Examples of the diisocyanate compound may include a compound represented by OCN—$C_nH_{2n}$—NCO (where n is an integer of 1 or more). A content of the diisocyanate compound in the solvent is not particularly limited, but is, for example, from 0.5 wt % to 5 wt % both inclusive. Specific examples of the diisocyanate compound include OCN—$C_6H_{12}$—NCO.

It is to be noted that in the electrolyte layer 36 that is a gel electrolyte, the solvent contained in the electrolytic solution refers to a wide concept that encompasses not only a liquid material but also a material having ionic conductivity that has ability to dissociate the electrolyte salt. Hence, in a case where a polymer compound having ionic conductivity is used, the polymer compound is also encompassed by the solvent.

Moreover, the other materials include, for example, one or more of electrolyte salts such as a lithium salt. However, the electrolyte salt may contain a salt other than the lithium salt. Examples of the salt other than the lithium salt include a salt of a light metal other than lithium.

Specific examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr).

In particular, one or more of lithium hexafluorophosphate, lithium tetrafluoroborate, lithium perchlorate, and lithium hexafluoroarsenate are preferable, and lithium hexafluorophosphate is more preferable. These lithium salts make it possible to decrease internal resistance.

In addition, the electrolyte salt may be one or more of compounds represented by respective formulas (7), (8), and (9). It is to be noted that R41 and R43 may be groups of a same kind or groups of different kinds. R51 to R53 may be groups of a same kind or groups of different kinds. It goes without saying that some of R51 to R53 may be groups of a same kind. R61 and R62 may be groups of a same kind or groups of different kinds.

[Chem. 5]

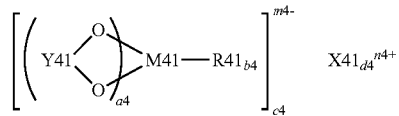

(7)

where X41 is one of Group 1 elements and Group 2 elements in the long form of the periodic table of the elements and aluminum (Al), M41 is one of transition metals, and Group 13 elements, Group 14 elements, and Group 15 elements in the long form of the periodic table of the elements, R41 is a halogen group, Y41 is one of —C(=O)—R42-C(=O)—, —C(=O)—CR43$_2$-, and —C(=O)—C(=O)—, R42 is one of an alkylene group, a halogenated alkylene group, an arylene group, and a halogenated arylene group, R43 is one of an alkyl group, a halogenated alkyl group, an aryl group, and a halogenated aryl group, a4 is an integer of 1 to 4, b4 is an integer of 0, 2, or 4, and each of c4, d4, m4, and n4 is an integer of 1 to 3.

[Chem. 6]

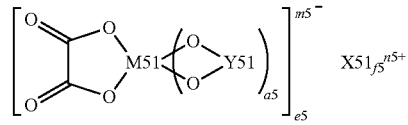

(8)

where X51 is one of Group 1 elements and Group 2 elements in the long form of the periodic table of the elements, M51 is one of transition metals, and Group 13 elements, Group 14 elements, and Group 15 elements in the long form of the periodic table of the elements, Y51 is one of —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{c5}$-S(=O)$_2$—, —S(=O)$_2$—(CR52$_2$)$_{d5}$-S(=O)$_2$—, and —C(=O)—(CR52$_2$)$_{d5}$-S(=O)$_2$—, each of R51 and R53 is one of a hydrogen group, an alkyl group, a halogen group, and a halogenated alkyl group, one or more of R51's are one of the halogen group and the halogenated alkyl group, one or more of R53's are one of the halogen group and the halogenated alkyl group, R52 is one of a hydrogen group, an alkyl group, a halogen group, and a halogenated alkyl group, each of a5, e5, and n5 is an integer of 1 or 2, each of b5 and d5 is an integer of 1 to 4, c5 is an integer of 0 to 4, and each of f5 and m5 is an integer of 1 to 3.

[Chem. 7]

(9)

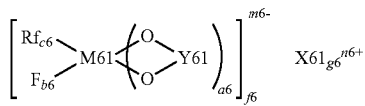

where X61 is one of Group 1 elements and Group 2 elements in the long form of the periodic table of the elements, M61 is one of transition metals, and Group 13 elements, Group 14 elements, and Group 15 elements in the long form of the periodic table of the elements, Rf is one of a fluorinated alkyl group and a fluorinated aryl group, the number of carbons in each of the fluorinated alkyl group and the fluorinated aryl group is from 1 to 10, Y61 is one of —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$—, —S(=O)$_2$—(CR61$_2$)$_{e6}$-S(=O)$_2$—, and —C(=O)—(CR61$_2$)$_{e6}$-S(=O)$_2$—, R61 is one of a hydrogen group, an alkyl group, a halogen group, and a halogenated alkyl group, R62 is one of a hydrogen group, an alkyl group, a halogen group, and a halogenated alkyl group, one or more of R62's are one of the halogen group and the halogenated alkyl group, each of a6, f6, and n6 is an integer of 1 or 2, each of b6, c6, and e6 is an integer of 1 to 4, d6 is an integer of 0 to 4, and each of g6 and m6 is an integer of 1 to 3.

It is to be noted that the Group 1 elements include hydrogen (H), lithium (Li), sodium (Na), potassium (K), rubidium (Rb), cesium (Cs), and francium (Fr). The Group 2 elements include beryllium (Be), magnesium (Mg), calcium (Ca), strontium (Sr), barium (Ba), and radium (Ra). The Group 13 elements include boron (B), aluminum (Al), gallium (Ga), indium (In), and thallium (Tl). The Group 14 elements include carbon (C), silicon (Si), germanium (Ge), tin (Sn), and lead (Pb). The Group 15 elements include nitrogen (N), phosphorus (P), arsenic (As), antimony (Sb), and bismuth (Bi).

Specific examples of the compound represented by the formula (7) include compounds represented by the following respective formulas (7-1) to (7-6). Specific examples of the compound represented by the formula (8) include compounds represented by the following respective formulas (8-1) to (8-8). Specific examples of the compound represented by the formula (9) include a compound represented by the following formula (9-1).

[Chem. 8]

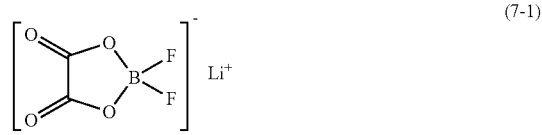
(7-1)

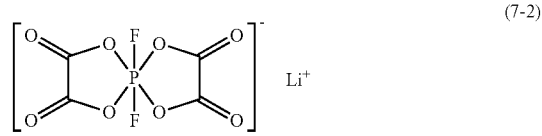
(7-2)

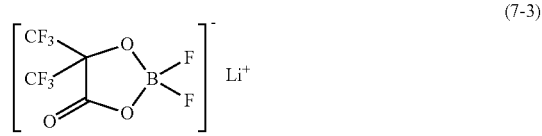
(7-3)

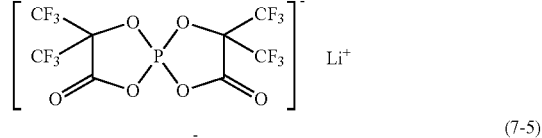
(7-4)

(7-5)

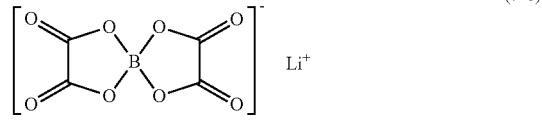
(7-6)

[Chem. 9]

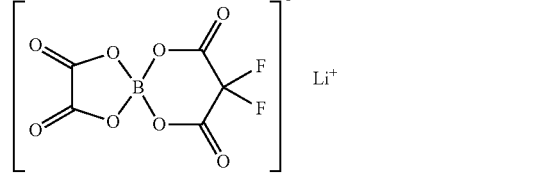
(8-1)

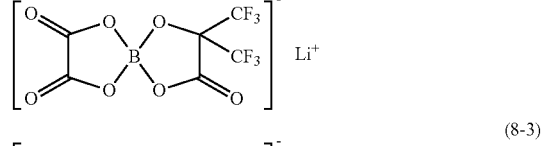
(8-2)

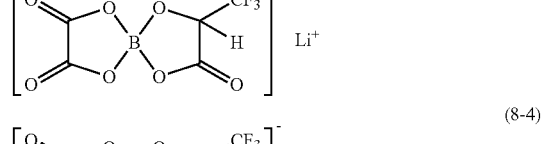
(8-3)

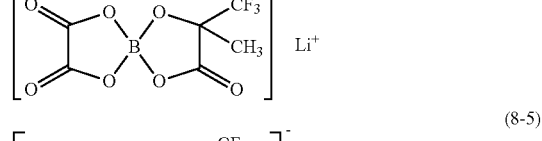
(8-4)

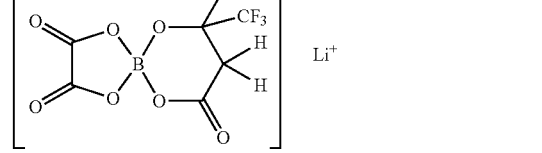
(8-5)

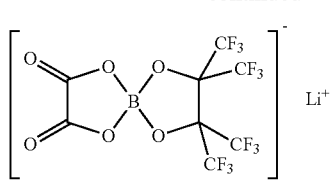
(8-6)

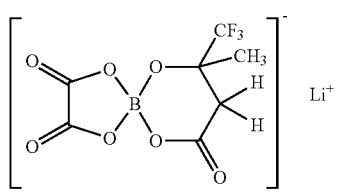
(8-7)

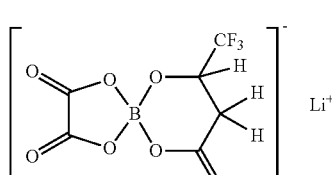
(8-8)

[Chem. 10]

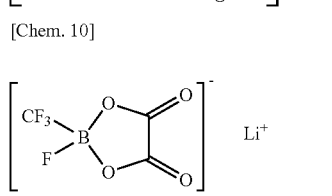
(9-1)

Moreover, the electrolyte salt may be one or more of compounds represented by the following formulas (10), (11), and (12). Values of m and n may be the same as or different from each other. Values of p, q, and r may be the same as or different from one another. It goes without saying that the values of two of p, q, and r may be the same as each other.

$$\text{LiN}(C_mF_{2m+1}SO_2)(C_nF_{2n+1}SO_2) \quad (10)$$

where each of m and n is an integer of 1 or more.

[Chem. 11]

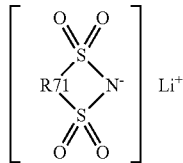
(11)

where R71 is a straight-chain or branched perfluoroalkylene group having 2 to 4 carbons.

$$\text{LiC}(C_pF_{2p+1}SO_2)(C_qF_{2q+1}SO_2)(C_rF_{2r+1}SO_2) \quad (12)$$

where each of p, q, and r is an integer of 1 or more.

The compound represented by the formula (10) is a chain imide compound. Specific examples of the chain imide compound include lithium bis(fluorosulfonyl)imide (LiN(SO$_2$F)$_2$), lithium bis(trifluoromethane-sulfonyl)imide (LiN(CF$_2$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), and lithium (trifluoromethanesulfonyl)(nonafluorobutanesulfonyl)imide (LiN(CF$_3$SO$_2$)(C$_4$F$_9$SO$_2$)).

The compound represented by the formula (11) is a cyclic imide compound. Specific examples of the cyclic imide compound include compounds represented by the following respective formulas (11-1) to (11-4).

[Chem. 12]

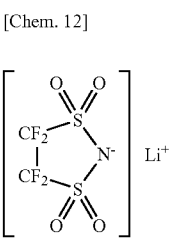
(11-1)

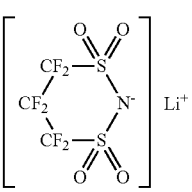
(11-2)

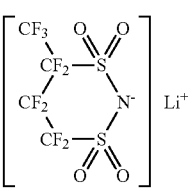
(11-3)

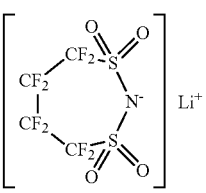
(11-4)

The compound represented by the formula (12) is a chain methide compound. Specific examples of the chain methide compound include lithium tris(trifluoromethanesulfonyl)methide (LiC(CF$_3$SO$_2$)$_3$).

A content of the electrolyte salt is not particularly limited; however, in particular, the content of the electrolyte salt is preferably within a range of 0.3 mol/kg to 3.0 mol/kg both inclusive with respect to the solvent. This makes it possible to achieve high ionic conductivity.

Moreover, the other materials may be one or more of materials other than the materials mentioned above. Examples of the materials other than the materials mentioned above include a phosphorus-fluorine-containing salt such as lithium difluorophosphate (LiPF$_2$O$_2$) and lithium fluorophosphate (Li$_2$PFO$_3$). A content of the phosphorus-fluorine-containing salt in the electrolytic solution is not particularly limited.

[Operation of Secondary Battery]

This secondary battery operates, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 is manufactured, for example, by one of the following three procedures.

In a first procedure, first, the cathode 33 and the anode 34 are fabricated.

In a case where the cathode 33 is fabricated, the cathode active material, and, on as-necessary basis, for example, the cathode binder and the cathode conductor are mixed to obtain a cathode mixture. Subsequently, the cathode mixture is dispersed in, for example, an organic solvent to obtain paste cathode mixture slurry. Next, both surfaces of the cathode current collector 33A are coated with the cathode mixture slurry, and thereafter, the coated cathode mixture slurry is dried to form the cathode active material layer 33B. Thereafter, the cathode active material layer 33B is compression-molded with use of, for example, a roll pressing machine, while being heated on as-necessary basis. In this case, the cathode active material layer 33B may be compression-molded a plurality of times.

In a case where the anode 34 is fabricated, the anode active material layer 34B is formed on the anode current collector 34A by a procedure similar to the foregoing procedure of fabricating the cathode 33. More specifically, the anode active material, and, for example, the anode-cathode binder and the anode conductor are mixed to obtain an anode mixture. Subsequently, the anode mixture is dispersed in, for example, an organic solvent to obtain paste anode mixture slurry. Next, both surfaces of the anode current collector 34A are coated with the anode mixture slurry, and thereafter, the coated anode mixture slurry is dried to form the anode active material layer 34B. Lastly, the anode active material layer 34B is compression-molded with use of, for example, a roll pressing machine.

Subsequently, for example, the electrolytic solution, the polymer compound, and an organic solvent are mixed to prepare a precursor solution. Subsequently, the cathode 33 is coated with the precursor solution, and the coated precursor solution is dried to form the gel electrolyte layer 36. Moreover, the anode 34 is coated with the precursor solution, and the coated precursor solution is dried to form the gel electrolyte layer 36.

Subsequently, the cathode lead 31 is attached to the cathode current collector 33A by, for example, a welding method, and the anode lead 32 is attached to the anode current collector 34A by, for example, a welding method. Subsequently, the cathode 33 and the anode 34 are stacked with the separator 35 in between, and thereafter, the cathode 33, the anode 34, and the separator 35 are spirally wound to fabricate the spirally wound electrode body 30. Thereafter, the protective tape 37 is attached onto the outermost periphery of the spirally wound electrode body 30.

Lastly, the outer package member 40 is folded to interpose the spirally wound electrode body 30, and thereafter, the outer edges of the outer package member 40 are bonded by, for example, a thermal fusion bonding method to enclose the spirally wound electrode body 30 in the outer package member 40. In this case, the adhesive film 41 is inserted between the cathode lead 31 and the outer package member 40, and the adhesive film 41 is inserted between the anode lead 32 and the outer package member 40.

In a second procedure, first, the cathode lead 31 is attached to the cathode 33, and the anode lead 32 is attached to the anode 34. Subsequently, the cathode 33 and the anode 34 are stacked with the separator 35 in between and are spirally wound to fabricate a spirally wound body as a precursor of the spirally wound electrode body 30. Thereafter, the protective tape 37 is adhered to the outermost periphery of the spirally wound body.

Subsequently, the outer package member 40 is folded to interpose the spirally wound electrode body 30, and thereafter, the outer edges other than the outer edges on one side of the outer package member 40 are bonded by, for example, a thermal fusion bonding method, and the spirally wound body is contained inside a pouch formed of the outer package member 40.

Subsequently, the electrolytic solution, monomers that are raw materials of the polymer compound, a polymerization initiator, and, on as-necessary basis, other materials such as a polymerization inhibitor are mixed to prepare a composition for electrolyte. Subsequently, the composition for electrolyte is injected inside the pouch formed of the outer package member 40. Thereafter, the pouch formed of the outer package member 40 is hermetically sealed by, for example, a thermal fusion bonding method.

Lastly, the monomers are thermally polymerized to form the polymer compound. Thus, the electrolytic solution is held by the polymer compound to form the gel electrolyte layer 36.

In a third procedure, first, the spirally wound body is fabricated, and then contained inside the pouch formed of the outer package member 40 in a manner similar to that of the second procedure described above, except that the separator 35 provided with the polymer compound layer is used. Subsequently, the electrolytic solution is prepared, and then injected inside the pouch formed of the outer package member 40. Thereafter, an opening of the pouch formed of the outer package member 40 is hermetically sealed by, for example, a thermal fusion bonding method.

Lastly, the resultant is heated while a weight is applied to the outer package member 40 to cause the separator 35 to be closely attached to the cathode 33 with the polymer compound layer in between and to be closely attached to the anode 34 with the polymer compound layer in between. Thus, each of the polymer compound layers is impregnated with the electrolytic solution, and each of the polymer compound layers is gelated. Thus, the electrolyte layer 36 is formed.

In the third procedure, swollenness of the secondary battery is suppressed more than in the first procedure. Further, in the third procedure, for example, the nonaqueous solvent and the monomers (the raw materials of the polymer compound) are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the laminated film type secondary battery, the electrolyte layer 36 containing the electrolytic solution is contained in the film-like outer package member 40, and the electrolytic solution includes the sulfuric acid compound. In this case, chemical stability of the electrolytic solution is improved as described above, thereby suppressing decomposition reaction of the electrolytic solution during charge and discharge. Accordingly, even if charge and discharge are repeated, the laminated film type secondary battery of which swollenness is easily visible is resistant to swelling, and discharge capacity is less prone to decrease. This makes it possible to achieve superior battery characteristics.

In particular, X1 in the formula (1) is one of the alkali metal elements and the alkaline-earth metal elements, and in particular, X is lithium, which makes it possible to achieve a higher effect.

Moreover, the central atom (M) in the formula (1) is one of boron, phosphorus, and aluminum, which makes it possible to achieve a higher effect.

Further, the fluorine-containing group (—Rf) in the formula (1) is the monovalent fluorinated hydrocarbon group, and in particular, the fluorine-containing group is the fluorinated alkyl group, which makes it possible to achieve a higher effect. In this case, the number of carbons in the monovalent fluorinated hydrocarbon group is from 1 to 10, which makes it possible to achieve a still higher effect.

Furthermore, the content of the sulfuric acid compound in the electrolytic solution is from 0.01 mol/kg to 1 mol/kg both inclusive, which makes it possible to achieve a higher effect.

It is to be noted that in the foregoing secondary battery, the electrolyte layer 36 containing the electrolytic solution is used; however, the electrolytic solution may be used as it is. In this case, the spirally wound electrode body 30 is impregnated with the electrolytic solution.

<1-2. Lithium Metal Secondary Battery (Laminated Film Type)>

A secondary battery described here is a laminated film type lithium metal secondary battery in which the capacity of the anode 34 is obtained by precipitation and dissolution of lithium metal. The secondary battery has a configuration similar to that of the foregoing laminated film type lithium-ion secondary battery, and is manufactured by a similar procedure, except that the anode active material layer 34B is made of the lithium metal.

In the secondary battery, the lithium metal is used as an anode active material, and high energy density is thereby achievable. The anode active material layer 34B may exist at the time of assembling, or the anode active material layer 34B may not necessarily exist at the time of assembling and may be made of the lithium metal precipitated during charge. Further, the anode active material layer 34B may be used as a current collector, and the anode current collector 34A may be omitted.

The secondary battery operates, for example, as follows. When the secondary battery is charged, lithium ions are extracted from the cathode 33, and the extracted lithium ions are precipitated as the lithium metal on the surface of the anode current collector 34A through the electrolytic solution. In contrast, when the secondary battery is discharged, the lithium metal is eluded as lithium ions from the anode active material layer 34B into the electrolytic solution, and is inserted in the cathode 33 through the electrolytic solution.

According to the laminated film type lithium metal secondary battery, the electrolytic solution includes the sulfuric acid compound. Therefore, superior battery characteristics are achievable for a reason similar to the reason in the foregoing lithium-ion secondary battery. Action and effects other than those described above are similar to those of the lithium-ion secondary battery.

<2. Applications of Secondary Battery>

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case where the secondary battery is used as the auxiliary power source, the kind of the main power source is not limited to the secondary battery.

Examples of the applications of the secondary battery include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery is effectively applicable to, for example, the battery pack, the electric vehicle, the electric power storage system, the electric power tool, and the electronic apparatus. In these applications, superior battery characteristics are demanded, and using the secondary battery of the present technology makes it possible to effectively improve performance. It is to be noted that the battery pack is a power source that uses the secondary battery, and is, for example, a so-called assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

<2-1. Battery Pack (Single Battery)>

FIG. 3 illustrates a perspective configuration of a battery pack using a single battery. FIG. 4 illustrates a block configuration of the battery pack illustrated in FIG. 3. It is to be noted that FIG. 3 illustrates the battery pack in an exploded state.

The battery pack described here is a simple battery pack using one secondary battery (a so-called soft pack), and is mounted in, for example, an electronic apparatus typified by a smartphone. For example, the battery pack includes a power source 111 that is the laminated film type secondary battery, and a circuit board 116 coupled to the power source 111, as illustrated in FIG. 3. A cathode lead 112 and an anode lead 113 are attached to the power source 111.

A pair of adhesive tapes 118 and 119 are adhered to both side surfaces of the power source 111. A protection circuit module (PCM) is formed in the circuit board 116. The circuit board 116 is coupled to the cathode 112 through a tab 114, and is coupled to the anode lead 113 through a tab 115. Moreover, the circuit board 116 is coupled to a lead 117 provided with a connector for external connection. It is to be noted that while the circuit board 116 is coupled to the power source 111, the circuit board 116 is protected from upper side and lower side by a label 120 and an insulating sheet 121. The label 120 is adhered to fix, for example, the circuit board 116 and the insulating sheet 121.

Moreover, for example, the battery pack includes the power source 111 and the circuit board 116 as illustrated in FIG. 4. The circuit board 116 includes, for example, a controller 121, a switch section 122, a PTC 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and includes, for example, a central processing unit (CPU) and a memory.

For example, in a case where a battery voltage reaches an overcharge detection voltage, the controller 121 so causes the switch section 122 to be disconnected that a charge current does not flow into a current path of the power source 111. Moreover, for example, in a case where a large current flows during charge, the controller 121 causes the switch section 122 to be disconnected, thereby blocking the charge current.

In addition, for example, in a case where the battery voltage reaches an overdischarge detection voltage, the controller 121 so causes the switch section 122 to be disconnected that a discharge current does not flow into the current path of the power source 111. Moreover, for example, in a case where a large current flows during discharge, the controller 121 causes the switch section 122 to be disconnected, thereby blocking the discharge current.

It is to be noted that the overcharge detection voltage of the secondary battery is, for example, 4.20 V±0.05 V, and the overdischarge detection voltage is, for example, 2.4 V±0.1 V.

The switch section 122 switches the used state of the power source 111 (whether the power source 111 is connectable to an external device) in accordance with an instruction from the controller 121. The switch section 122 includes, for example, a charge control switch and a discharge control switch. The charge control switch and the discharge control switch each are, for example, a semiconductor switch such as a field-effect transistor using a metal oxide semiconductor (MOSFET). It is to be noted that the charge current and the discharge current are detected on the basis of on-resistance of the switch section 122.

The temperature detector 124 measures a temperature of the power source 111, and outputs a result of the measurement to the controller 121. The temperature detector 124 includes, for example, a temperature detecting element such as a thermistor. It is to be noted that the result of the measurement by the temperature detector 124 is used, for example, in a case where the controller 121 performs charge and discharge control at the time of abnormal heat generation and in a case where the controller 121 performs a correction process at the time of calculating remaining capacity.

It is to be noted that the circuit board 116 may not include the PTC 123. In this case, a PTC element may be separately attached to the circuit board 116.

<2-2. Battery Pack (Assembled Battery)>

FIG. 5 illustrates a block configuration of a battery pack using an assembled battery. For example, the battery pack includes a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 is made of, for example, a plastic material.

The controller 61 controls an operation of the entire battery pack (including a used state of the power source 62), and includes, for example, a CPU. The power source 62 includes one or more secondary batteries of the present technology. The power source 62 is, for example, an assembled battery that includes two or more secondary batteries. The secondary batteries may be connected in series, in parallel, or in series-parallel combination. To give an example, the power source 62 includes six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 includes, for example, a charge control switch, a discharge control switch, a charging diode, and a discharging diode. The charge control switch and the discharge control switch each are, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement is used, for example, in a case where the controller 61 performs charge and discharge control at the time of abnormal heat generation and in a case where the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case where a battery voltage reaches an overcharge detection voltage, the switch controller 67 so causes the switch section 63 (the charge control switch) to be disconnected that a charge current does not flow into a current path of the power source 62. This makes it possible to perform only discharge through the discharging diode in the power source 62. It is to be noted that, for example, in a case where a large current flows during charge, the switch controller 67 blocks the charge current.

Further, for example, in a case where the battery voltage reaches an overdischarge detection voltage, the switch controller 67 so causes the switch section 63 (the discharge control switch) to be disconnected that a discharge current does not flow into the current path of the power source 62. This makes it possible to perform only charge through the charging diode in the power source 62. It is to be noted that, for example, in a case where a large current flows during discharge, the switch controller 67 blocks the discharge current.

It is to be noted that the overcharge detection voltage of the secondary battery is, for example, 4.20 V±0.05 V, and the overdischarge detection voltage is, for example, 2.4 V±0.1 V.

The memory 68 is, for example, an EEPROM that is a non-volatile memory. The memory 68 holds, for example, numerical values calculated by the controller 61 and information of the secondary battery measured in a manufacturing process (such as internal resistance in an initial state). It is to be noted that, in a case where the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 is, for example, a thermistor.

The cathode terminal 71 and the anode terminal 72 are terminals that are coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

<2-3. Electric Vehicle>

FIG. 6 illustrates a block configuration of a hybrid automobile that is an example of an electric vehicle. The electric vehicle includes, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle includes, for example, a front drive shaft 85 and a front tire 86 that are coupled to the differential 78 and the transmission 80, and a rear drive shaft 87, and a rear tire 88.

The electric vehicle is runnable with use of one of the engine 75 and the motor 77 as a drive source, for example. The engine 75 is a main power source, and is, for example, a petrol engine. In a case where the engine 75 is used as the power source, drive power (torque) of the engine 75 is transferred to the front tire 86 or the rear tire 88 via the differential 78, the transmission 80, and the clutch 81 that are drive sections, for example. It is to be noted that the torque of the engine 75 is also transferred to the electric generator 79. With use of the torque, the electric generator 79 generates alternating-current electric power. The generated alternating-current electric power is converted into direct-current electric power via the inverter 83, and the converted electric power is accumulated in the power source 76. In contrast, in a case where the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 is transferred to the front tire 86 or the rear tire 8 via the differential 78, the transmission 80, and the clutch 81 that are the drive sections, for example.

It is to be noted that, when speed of the electric vehicle is decreased by a brake mechanism, resistance at the time of speed reduction is transferred to the motor 77 as torque, and the motor 77 generates alternating-current electric power by utilizing the torque. It is preferable that this alternating-current electric power be converted into direct-current electric power via the inverter 82, and the direct-current regenerative electric power be accumulated in the power source 76.

The controller 74 controls an operation of the entire electric vehicle, and includes, for example, a CPU. The power source 76 includes one or more secondary batteries of the present technology. The power source 76 is coupled to an external power source, and the power source 76 is allowed to accumulate electric power by receiving electric power supply from the external power source. The various sensors 84 are used, for example, for control of the number of revolutions of the engine 75 and for control of an opening level (a throttle opening level) of a throttle valve. The various sensors 84 include, for example, a speed sensor, an acceleration sensor, and an engine frequency sensor.

It is to be noted that, although the description has been given of the case where the electric vehicle is the hybrid automobile, the electric vehicle may be a vehicle (an electric automobile) that operates with use of only the power source 76 and the motor 77 and without using the engine 75.

<2-4. Electric Power Storage System>

FIG. 7 illustrates a block configuration of an electric power storage system. The electric power storage system includes, for example, a controller 90, a power source 91, a smart meter 92, and a power hub 93 inside a house 89 such as a general residence or a commercial building.

In this example, the power source 91 is coupled to an electric device 94 provided inside the house 89 and is allowed to be coupled to an electric vehicle 96 parked outside the house 89, for example. Further, for example, the power source 91 is coupled to a private power generator 95 provided in the house 89 via the power hub 93, and is allowed to be coupled to an outside concentrating electric power system 97 via the smart meter 92 and the power hub 93.

It is to be noted that the electric device 94 includes, for example, one or more home electric products. Examples of the home electric products include a refrigerator, an air conditioner, a television, and a water heater. The private power generator 95 includes, for example, one or more of a solar power generator, a wind power generator, and other power generators. The electric vehicle 96 includes, for example, one or more of an electric automobile, an electric motorcycle, a hybrid automobile, and other electric vehicles. The concentrating electric power system 97 includes, for example, one or more of a thermal power plant, an atomic power plant, a hydraulic power plant, a wind power plant, and other power plants.

The controller 90 controls an operation of the entire electric power storage system (including a used state of the power source 91), and includes, for example, a CPU. The power source 91 includes one or more secondary batteries of the present technology. The smart meter 92 is an electric power meter that is compatible with a network and is provided in the house 89 demanding electric power, and is communicable with an electric power supplier, for example.

Accordingly, for example, while the smart meter 92 communicates with outside, the smart meter 92 controls balance between supply and demand in the house 89, which allows for effective and stable energy supply.

In the electric power storage system, for example, electric power is accumulated in the power source 91 from the concentrating electric power system 97, that is an external power source, via the smart meter 92 and the power hub 93, and electric power is accumulated in the power source 91 from the private power generator 95, that is an independent power source, via the power hub 93. The electric power accumulated in the power source 91 is supplied to the electric device 94 and the electric vehicle 96 in accordance with an instruction from the controller 90. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, it is possible to accumulate electric power in the power source 91 from the concentrating electric power system 97 in the middle of night when an electric rate is inexpensive, and it is possible to use the electric power accumulated in the power source 91 during daytime hours when the electric rate is expensive.

It is to be noted that the foregoing electric power storage system may be provided for each household (each family unit), or may be provided for a plurality of households (a plurality of family units).

<2-5. Electric Power Tool>

FIG. 8 illustrates a block configuration of an electric power tool. The electric power tool is, for example, an electric drill, and includes a controller 99 and a power source 100 inside a tool body 98 made of a plastic material, for example. A drill section 101 that is a movable section is attached to the tool body 98 in an operable (rotatable) manner, for example.

The controller 99 controls an operation of the entire electric power tool (including a used state of the power source 100), and includes, for example, a CPU. The power source 100 includes one or more secondary batteries of the present technology. The controller 99 allows electric power to be supplied from the power source 100 to the drill section 101 in accordance with an operation by an operation switch.

EXAMPLES

Examples of the present technology are described in detail below.

Experimental Examples 1-1 to 1-12

The laminated film type lithium-ion secondary batteries illustrated in FIGS. 1 and 2 were fabricated by the following procedure.

The cathode 33 was fabricated as follows. First, 90 parts by mass of a cathode active material ($LiCoO_2$), 5 parts by mass of a cathode binder (polyvinylidene fluoride), and 5 parts by mass of a cathode conductor (ketjen black) were mixed to obtain a cathode mixture. Subsequently, the cathode mixture was dispersed in an organic solvent (N-methyl-2-pyrrolidone) to obtain cathode mixture slurry. Subsequently, both surfaces of the cathode current collector 33A (an aluminum foil having a thickness of 15 km) were uniformly coated with the cathode mixture slurry, and thereafter, the cathode mixture slurry was dried to form the cathode active material layer 33B. Lastly, the cathode active material layer 33B was compression-molded with use of a roll pressing machine, and thereafter, the cathode current collector 33A on which the cathode active material layer 33B was formed was cut into a strip shape (48 mm×300 mm).

The anode 34 was fabricated as follows. First, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain anode mixture slurry. Subsequently, both surfaces of the anode current collector 34A (a copper foil having a thickness of 15 km) were uniformly coated with the anode mixture slurry, and thereafter, the anode mixture slurry was dried to form the anode active material layer 34B. Lastly, the anode active material layer 34B was compression-molded with use of a roll pressing machine, and thereafter, the anode current collector 34A on which the anode active material layer 34B was formed was cut into a strip shape (50 mm×310 mm).

An electrolytic solution was prepared as follows. An electrolyte salt ($LiPF_6$) was dispersed in a solvent, and thereafter, a sulfuric acid compound was added into the solvent on as-necessary basis. As the solvent, a mixture of ethylene carbonate (EC) and diethyl carbonate (DEC) was used. A composition of the solvent (in weight ratio) was ethylene carbonate:diethyl carbonate=50:50. The kind and content (mol/kg) of the electrolyte salt, and the presence or absence, kind, and content (mol/kg) of the sulfuric acid compound are as illustrated in Table 1.

The secondary battery was assembled as follows. First, the cathode lead 25 made of aluminum was attached to the cathode current collector 33A of the cathode 33 by welding, and the anode lead 26 made of copper was attached to the anode current collector 34A of the anode 34 by welding. Subsequently, the cathode 33 and the anode 34 were stacked with the separator 35 (a microporous polyethylene film having a thickness of 25 μm) in between, and the cathode 33, the anode 34, and the separator 35 were spirally wound in a longitudinal direction to fabricate the spirally wound electrode body 30. Thereafter, the protective tape 37 was attached onto the outermost periphery of the spirally wound electrode body 30.

Subsequently, the spirally wound electrode body 30 was sandwiched between two film-like outer package members 40, and thereafter, the outer edges on three sides of the outer package members 40 were thermally fusion-bonded. Thus, a pouch was formed of the outer package members 40. The outer package members 40 used here each were a moisture-resistant aluminum laminated film in which a 25-μm-thick nylon film, a 40-μm-thick aluminum foil, and a 30-μm-thick polypropylene film were laminated in this order from outside. Lastly, the electrolytic solution was injected inside the pouch formed of the outer package members 40, and the separator 35 was impregnated with the electrolytic solution. Thereafter, outer edges on the remaining one side of the outer package members 40 were thermally fusion-bonded in a reduced-pressure environment.

Thus, the laminated film type secondary batteries were completed.

Experimental Examples 2-1 to 2-12

For comparison, cylindrical type lithium-ion secondary batteries illustrated in FIGS. 9 and 10 were fabricated by the following procedure. FIG. 9 illustrates a cross-sectional configuration of the cylindrical secondary battery, and FIG. 10 illustrates a cross-sectional configuration of part of a spirally wound electrode body 20 illustrated in FIG. 9.

It is to be noted that in the following description, the procedure of manufacturing the laminated film secondary battery that has been already described is used where appropriate.

A cathode 21 was fabricated as follows. A cathode active material layer 21B was formed on both surfaces of a cathode current collector 21A by a procedure similar to the procedure of fabricating the cathode 33. An anode 22 was fabricated as follows. An anode active material layer 22B was formed on both surfaces of an anode current collector 22A by a procedure similar to the procedure of fabricating the anode 34.

The secondary battery was assembled as follows. First, a cathode lead 25 made of aluminum was attached to the cathode current collector 21A by welding, and an anode lead 26 made of nickel was attached to the anode current collector 22A by welding. Subsequently, the cathode 21 and the anode 22 was stacked with a separator 23 similar to the separator 35 in between, and the cathode 21, the anode 22, and the separator 23 were spirally wound in a longitudinal direction to fabricate a spirally wound electrode body 20. Thereafter, a winding end portion of the spirally wound electrode body 20 was fixed with use of an adhesive tape.

Subsequently, a center pin 24 was inserted in a center of the spirally wound electrode body 20. Subsequently, the spirally wound electrode body 20 was sandwiched between a pair of insulating plates 12 and 13, and was contained inside a battery can 11 made of nickel-plated iron. In this case, an end tip of the cathode lead 25 was attached to a safety valve mechanism 15 by welding, and an end tip of the anode lead 26 was attached to the battery can 11 by welding. Subsequently, the electrolytic solution was injected inside the battery can 11 by a decompression method, and the spirally wound electrode body 20 was impregnated with the electrolytic solution. Lastly, a battery cover 14, the safety valve mechanism 15, and a positive temperature coefficient device 16 were swaged with a gasket 17 at an open end of the battery can 11. The composition of the electrolytic solution was as illustrated in Table 2.

Thus, the cylindrical type secondary batteries were completed. It is to be noted that in a case where the secondary battery was fabricated, a thickness of the cathode active material layer 21B was adjusted to prevent lithium metal from being precipitated on the anode 22 in a completely-charged state.

Results illustrated in Tables 1 and 2 were obtained by examination of cycle characteristics, storage characteristics, load characteristics, and swollenness characteristics as battery characteristics of the secondary batteries.

The cycle characteristics were examined as follows. First, one cycle of charge and discharge was performed on the secondary battery in an ambient temperature environment (23° C.) to stabilize a battery state of the secondary battery, and thereafter, one cycle of charge and discharge was further performed on the secondary battery in a high-temperature environment (60° C.), and discharge capacity was measured. Subsequently, the secondary battery was repeatedly charged and discharged until the total number of cycles reached 100 cycles in the same environment (60° C.), and discharge capacity was measured. A cycle retention ratio (%)=(discharge capacity at the 100th cycle/discharge capacity at the second cycle)×100 was calculated from these results. When the secondary battery was charged, charge was performed at a current of 0.2 C until the voltage reached 4.35 V, and thereafter, charge was further performed at the voltage of 4.35 V until the current reached 0.05 C. When the secondary battery was discharged, discharge was performed at a current of 0.2 C until the voltage reached 2.5 V. It is to be noted that "0.2 C" refers to a current value at which the battery capacity (theoretical capacity) is completely discharged in 5 hours, and "0.05 C" refers to a current value at which the battery capacity is completely discharged in 20 hours.

The storage characteristics were examined as follows. One cycle of charge and discharge was performed, in an ambient environment (23° C.), on the secondary battery having a battery state stabilized by a similar procedure to that in a case of examining the cycle characteristics, and discharge capacity was measured. Subsequently, the secondary battery was charged again, and the secondary battery kept in a charged state was stored in a constant-temperature bath (80° C.) for 10 days, and thereafter, the secondary battery was discharged in the ambient temperature environment, and discharge capacity was measured. A storage retention ratio (%)=(discharge capacity after storage/discharge capacity before storage)×100 was calculated from these results. The charge and discharge conditions were similar to those in the case of examining the cycle characteristics.

The load characteristics were examined as follows. One cycle of charge and discharge was performed, in an ambient environment (23° C.), on the secondary battery having a battery state stabilized by a similar procedure to that in the case of examining the cycle characteristics, and discharge capacity was measured. Subsequently, the secondary battery was repeatedly charged and discharged in a low-temperature environment (−10° C.) until the total number of cycles reached 100 cycles, and discharge capacity was measured. A load retention ratio (%)=(discharge capacity at the 100th cycle/discharge capacity at the second cycle)×100 was calculated from these results. The charge and discharge conditions were similar to those in the case of examining the cycle characteristics, except that the current during discharge was changed to 1 C. It is to be noted that "1 C" refers to a current value at which the battery capacity (theoretical capacity) is completely discharged in 1 hour.

The swollenness characteristics were examined as follows. The secondary battery having a battery state stabilized by a similar procedure to the procedure of examining the cycle characteristics was charged again in the ambient temperature environment (23° C.), and thereafter, the thickness (mm) of the secondary battery was measured. Subsequently, the secondary battery kept in a charged state was stored in a high-temperature environment (60° C.) for one month, and thereafter, the thickness (mm) of the secondary battery was measured. Swollenness (mm)=the thickness after storage−the thickness before storage was calculated from these results. The charge and discharge conditions were similar to those in the case of examining the cycle characteristics.

TABLE 1

Battery Structure: Laminated Film Type

| Experimental Example | Sulfuric Acid Compound Kind | Sulfuric Acid Compound Content (mol/kg) | Electrolyte Salt Kind | Electrolyte Salt Content (mol/kg) | Cycle Retention Ratio (%) | Storage Retention Ratio (%) | Load Retention Ratio (%) | Swollenness (mm) |
|---|---|---|---|---|---|---|---|---|
| 1-1 | LiBF$_2$SO$_4$ | 0.01 | LiPF$_6$ | 1 | 74 | 82 | 52 | 0.6 |
| 1-2 | | 0.05 | | | 80 | 83 | 55 | 0.55 |
| 1-3 | | 0.1 | | | 88 | 85 | 60 | 0.55 |
| 1-4 | | 0.2 | | | 85 | 85 | 62 | 0.58 |
| 1-5 | | 0.5 | | | 82 | 82 | 61 | 0.62 |
| 1-6 | | 1 | — | — | 78 | 80 | 58 | 0.65 |
| 1-7 | — | — | LiPF$_6$ | 1 | 68 | 76 | 48 | 0.8 |
| 1-8 | | | | 1.01 | 68 | 76 | 48 | 0.8 |
| 1-9 | | | | 1.05 | 68 | 77 | 49 | 0.82 |
| 1-10 | | | | 1.1 | 70 | 78 | 49 | 0.82 |
| 1-11 | | | | 1.2 | 70 | 78 | 50 | 0.84 |
| 1-12 | | | | 1.5 | 70 | 78 | 50 | 0.82 |

TABLE 2

Battery Structure: Cylindrical Type

| Experimental Example | Sulfuric Acid Compound Kind | Sulfuric Acid Compound Content (mol/kg) | Electrolyte Salt Kind | Electrolyte Salt Content (mol/kg) | Cycle Retention Ratio (%) | Storage Retention Ratio (%) | Load Retention Ratio (%) | Swollenness (mm) |
|---|---|---|---|---|---|---|---|---|
| 2-1 | LiBF$_2$SO$_4$ | 0.01 | LiPF$_6$ | 1 | 78 | 82 | 48 | 0 |
| 2-2 | | 0.05 | | | 82 | 84 | 52 | 0 |
| 2-3 | | 0.1 | | | 88 | 86 | 58 | 0 |
| 2-4 | | 0.2 | | | 86 | 86 | 58 | 0 |
| 2-5 | | 0.5 | | | 82 | 84 | 58 | 0 |
| 2-6 | | 1 | — | — | 80 | 80 | 56 | 0 |
| 2-7 | — | — | LiPF$_6$ | 1 | 85 | 83 | 60 | 0 |
| 2-8 | | | | 1.01 | 88 | 86 | 62 | 0 |
| 2-9 | | | | 1.05 | 90 | 88 | 62 | 0 |
| 2-10 | | | | 1.1 | 90 | 88 | 65 | 0 |
| 2-11 | | | | 1.2 | 90 | 87 | 65 | 0 |
| 2-12 | | | | 1.5 | 89 | 87 | 65 | 0 |

There were a clear difference in the battery characteristics between the laminated film type secondary battery in which the electrolytic solution was contained in the film-like outer package members 40 and the cylindrical type secondary battery in which the electrolytic solution was contained in the battery can 11 made of iron depending on the presence or absence of the sulfuric acid compound in the electrolytic solution.

More specifically, in the cylindrical secondary battery, in a case where the electrolytic solution included the sulfuric acid compound (experimental examples 2-1 to 2-6), as compared with a case where the electrolytic solution did not include the sulfuric acid compound (experimental examples 2-7 to 2-12), all of the cycle retention ratio, the storage retention ratio, and the load retention ratio were decreased, as illustrated in Table 2. It is to be noted that the cylindrical type secondary battery was not swollen basically; therefore, swollenness was not changed depending on the presence or absence of the sulfuric acid compound.

In contrast, in the laminated film type secondary battery, in a case where the electrolytic solution included the sulfuric acid compound (experimental examples 1-1 to 1-6), as compared with a case where the electrolytic solution did not include the sulfuric acid compound (experimental examples 1-7 to 1-12), all of the cycle retention ratio, the storage retention ratio, and the load retention ratio were increased, as illustrated in Table 1. Moreover, the laminated film type secondary battery was swollen; however, in the case where the electrolytic solution included the sulfuric acid solution, the swollenness was decreased, as compared with the case where the electrolytic solution did not include the sulfuric acid solution.

In particular, in the laminated film type secondary battery, in a case where the content of the sulfuric acid compound in the electrolytic solution was from 0.01 mol/kg to 1 mol/kg both inclusive, a high cycle retention ratio, a high storage retention ratio, and a high load retention ratio were obtained, and swollenness was sufficiently decreased.

Experimental Examples 3-1 to 3-6

Secondary batteries were fabricated and battery characteristics of the secondary batteries were examined in a similar procedure, except that an unsaturated cyclic carbonate ester was added to the electrolytic solution, as illustrated in Table 3. As the unsaturated cyclic carbonate ester, vinylene carbonate (VC), vinyl ethylene carbonate (VEC), and methylene ethylene carbonate (MEC) were used. It is to be noted that the presence or absence of the sulfuric acid compound, the content (wt %) of the sulfuric acid compound in the electrolytic solution, the presence or absence of the unsaturated cyclic carbonate ester, and the content (wt %) of the unsaturated cyclic carbonate ester in the electrolytic solution are as illustrated in Table 3.

(DFEC), and bis(fluoromethyl) carbonate (DFDMC) were used. It is to be noted that the presence or absence of the

TABLE 3

Battery Structure: Laminated Film Type

| Experimental Example | Sulfuric Acid Compound | | Electrolyte Salt | | Unsaturated Cyclic Carbonate Ester | | Cycle Retention Ratio (%) | Storage Retention Ratio (%) | Load Retention Ratio (%) | Swollenness (mm) |
|---|---|---|---|---|---|---|---|---|---|---|
| | Kind | Content (mol/kg) | Kind | Content (mol/kg) | Kind | Content (mol/kg) | | | | |
| 3-1 | $LiBF_2SO_4$ | 0.1 | $LiPF_6$ | 1 | VC | 2 | 90 | 87 | 66 | 0.32 |
| 3-2 | | | | | VEC | 2 | 90 | 88 | 65 | 0.35 |
| 3-3 | | | | | MEC | 2 | 90 | 88 | 65 | 0.32 |
| 1-10 | — | — | $LiPF_6$ | 1.1 | — | — | 70 | 78 | 49 | 0.82 |
| 1-3 | $LiBF_2SO_4$ | 0.1 | $LiPF_6$ | 1 | — | — | 88 | 85 | 60 | 0.55 |
| 3-4 | — | — | $LiPF_6$ | 1.1 | VC | 2 | 75 | 82 | 46 | 1.22 |
| 3-5 | | | | | VEC | 2 | 73 | 81 | 48 | 1.1 |
| 3-6 | | | | | MEC | 2 | 75 | 82 | 48 | 0.98 |

In a case where the electrolytic solution included one of the sulfuric acid compound and the unsaturated cyclic carbonate ester (experimental examples 1-3 and 3-4 to 3-6), as compared with a case where the electrolytic solution included neither the sulfuric acid compound nor the unsaturated cyclic carbonate ester (the experimental example 1-10), none of the cycle retention ratio, the storage retention ratio, and the load retention ratio was sufficiently increased, and swollenness was pronouncedly increased in some cases.

In contrast, in a case where the electrolytic solution included both the sulfuric acid compound and the unsaturated cyclic carbonate ester (experimental examples 3-1 to 3-3), as compared with the case where the electrolytic solution included neither the sulfuric acid compound nor the unsaturated cyclic carbonate ester (the experimental example 1-10), all of the cycle retention ratio, the storage retention ratio, and the load retention ratio were sufficiently increased, and swollenness was remarkably suppressed.

Experimental Examples 4-1 to 4-6

Secondary batteries were fabricated and battery characteristics of the secondary batteries were examined in a similar procedure, except that a halogenated carbonate ester was added to the electrolytic solution, as illustrated in Table 4. As the halogenated carbonate ester, 4-fluoro-1,3-dioxolane-2-one (FEC), 4,5-difluoro-1,3-dioxolane-2-one (DFEC), and bis(fluoromethyl) carbonate (DFDMC) were used. It is to be noted that the presence or absence of the sulfuric acid compound, the content (wt %) of the sulfuric acid compound in the electrolytic solution, the presence or absence of the halogenated carbonate ester, and the content (wt %) of the halogenated carbonate ester in the electrolytic solution are as illustrated in Table 4.

TABLE 4

Battery Structure: Laminated Film Type

| Experimental Example | Sulfuric Acid Compound | | Electrolyte Salt | | Halogenated Carbonate Ester | | Cycle Retention Ratio (%) | Storage Retention Ratio (%) | Load Retention Ratio (%) | Swollenness (mm) |
|---|---|---|---|---|---|---|---|---|---|---|
| | Kind | Content (mol/kg) | Kind | Content (mol/kg) | Kind | Content (mol/kg) | | | | |
| 4-1 | $LiBF_2SO_4$ | 0.01 | $LiPF_6$ | 1 | FEC | 2 | 92 | 87 | 71 | 0.5 |
| 4-2 | | | | | DFEC | 2 | 90 | 86 | 68 | 0.58 |
| 4-3 | | | | | DFDMC | 2 | 90 | 86 | 68 | 0.58 |
| 1-10 | — | — | $LiPF_6$ | 1.1 | — | — | 70 | 78 | 49 | 0.82 |
| 1-3 | $LiBF_2SO_4$ | 0.1 | $LiPF_6$ | 1 | — | — | 88 | 85 | 60 | 0.55 |
| 4-4 | — | — | $LiPF_6$ | 1.1 | FEC | 2 | 80 | 77 | 52 | 1.54 |
| 4-5 | | | | | DFEC | 2 | 78 | 77 | 48 | 2.02 |
| 4-6 | | | | | DFDMC | 2 | 78 | 77 | 50 | 1.58 |

In a case where the electrolytic solution included one of the sulfuric acid compound and the halogenated carbonate ester (experimental examples 1-3 and 4-4 to 4-6), as compared with a case where the electrolytic solution included neither the sulfuric acid compound nor the halogenated carbonate ester (the experimental example 1-10), none of the cycle retention ratio, the storage retention ratio, and the load retention ratio was sufficiently increased, and swollenness was pronouncedly increased in some cases.

In contrast, in a case where the electrolytic solution included both the sulfuric acid compound and the halogenated carbonate ester (experimental examples 4-1 to 4-3), as compared with the case where the electrolytic solution included neither the sulfuric acid compound nor the halogenated carbonate ester (the experimental example 1-10), all of the cycle retention ratio, the storage retention ratio, and the load retention ratio were sufficiently increased, and swollenness was remarkably suppressed.

Experimental Examples 5-1 to 5-5

Secondary batteries were fabricated and battery characteristics of the secondary batteries were examined in a similar procedure, except that the composition of the solvent was changed, as illustrated in Table 5. In this case, in place of diethyl carbonate (DEC), propylene carbonate (PC), dimethyl carbonate (DMC), and ethyl methyl carbonate (EMC) were used. Moreover, a mixture of three kinds of solvents was used, and the composition of the solvents was EC:PC:DEC=50:50:50 and EC:PC:EMC=50:50:50 in weight ratio.

Even though the electrolytic solution included the other material, in a case where in the laminated film type secondary battery, the electrolytic solution included the sulfuric acid compound, a high cycle retention ratio, a high storage retention ratio, and a high load retention ratio were obtained, and swollenness was sufficiently suppressed. In particular, in a case where the electrolytic solution included the sulfuric

TABLE 5

Battery Structure: Laminated Film Type

| Experimental Example | Solvent | Sulfuric Acid Compound Kind | Content (mol/kg) | Electrolyte Salt Kind | Content (mol/kg) | Cycle Retention Ratio (%) | Storage Retention Ratio (%) | Load Retention Ratio (%) | Swollenness (mm) |
|---|---|---|---|---|---|---|---|---|---|
| 1-3 | EC + DEC | LiBF$_2$SO$_4$ | 0.1 | LiPF$_6$ | 1 | 88 | 85 | 60 | 0.55 |
| 5-1 | EC + PC | | | | | 82 | 86 | 48 | 0.21 |
| 5-2 | EC + DMC | | | | | 88 | 85 | 70 | 0.62 |
| 5-3 | EC + EMC | | | | | 88 | 85 | 68 | 0.65 |
| 5-4 | EC + PC + DEC | | | | | 85 | 86 | 68 | 0.3 |
| 5-5 | EC + PC + EMC | | | | | 85 | 86 | 68 | 0.38 |

Even though the composition of the solvent was changed, in a case where the electrolytic solution included the sulfuric acid compound, a high cycle retention ratio, a high storage retention ratio, and a high load retention ratio were obtained, and swollenness was sufficiently suppressed.

Experimental Examples 6-1 to 6-10

Secondary batteries were fabricated and battery characteristics of the secondary batteries were examined in a similar procedure, except that one of other materials was added to the electrolytic solution, as illustrated in Table 6.

The following materials were used as the other materials. As a monosulfonate ester, propane sultone (PS) and propene sultone (PRS) were used. As a disulfonate ester, the compound (OSAH) represented by the formula (6-2) was used. As an acid anhydride, succinic anhydride (SA) and propanedisulfonic anhydride (PSAH) were used. As a dicyano compound, succinonitrile (SN) was used. As a diisocyanate compound, hexamethylene diisocyanate (HMI) was used. In addition, as an additional electrolyte salt, lithium tetrafluoroborate (LiBF$_4$), the compound (LiBOB) represented by the formula (7-6), and lithium bis(fluorosulfonyl)imide (LiFSI) were used. The contents (wt %) of the other materials in the electrolytic solution are as illustrated in Table 6.

acid compound, some or all of the cycle retention ratio, the storage retention ratio, and the load retention ratio were further increased, and swollenness was further decreased in some cases.

As can be seen from the results illustrated in Tables 1 to 6, in the case where the electrolytic solution was contained in the film-like outer package member, and the electrolytic solution included the sulfuric acid compound, the cycle characteristics, the storage characteristics, and the load characteristics were improved, while securing swollenness characteristics. Accordingly, superior battery characteristics were achieved in the secondary battery.

Although the present technology has been described above referring to some embodiments and examples, the present technology is not limited thereto, and may be modified in a variety of ways.

For example, the description has been given with reference to an example in which the battery element has the spirally wound structure. However, the structure of the battery element is not limited thereto. The secondary battery of the present technology is similarly applicable also to a case where the battery element has other structure such as a stacked structure.

Moreover, the present technology involves an example in which lithium is used as the electrode reactant; however, the

TABLE 6

Battery Structure: Laminated Film Type

| Experimental Example | Sulfuric Acid Compound Kind | Content (mol/kg) | Electrolyte Salt Kind | Content (mol/kg) | Other Material Kind | Content (mol/kg) | Cycle Retention Ratio (%) | Storage Retention Ratio (%) | Load Retention Ratio (%) | Swollenness (mm) |
|---|---|---|---|---|---|---|---|---|---|---|
| 1-3 | LiBF$_2$SO$_4$ | 0.1 | LiPF$_6$ | 1 | — | — | 88 | 85 | 60 | 0.55 |
| 6-1 | | | | | PS | 0.5 | 89 | 93 | 65 | 0.15 |
| 6-2 | | | | | PRS | 0.5 | 89 | 93 | 64 | 0.15 |
| 6-3 | | | | | OSAH | 0.5 | 89 | 91 | 64 | 0.32 |
| 6-4 | | | | | SA | 0.5 | 90 | 90 | 62 | 0.32 |
| 6-5 | | | | | PSAH | 0.5 | 92 | 94 | 70 | 0.15 |
| 6-6 | | | | | SN | 0.5 | 89 | 93 | 60 | 0.1 |
| 6-7 | | | | | HMI | 0.5 | 89 | 88 | 60 | 0.1 |
| 6-8 | | | | | LiBF$_4$ | 0.05 | 86 | 86 | 62 | 0.25 |
| 6-9 | | | | | LiBOB | 0.05 | 90 | 90 | 60 | 0.62 |
| 6-10 | | | | | LiFSI | 0.05 | 88 | 91 | 65 | 0.62 | electrode reactant is not limited to lithium. The electrode reactant may be any of other Group 1 elements such as sodium and potassium, Group 2 elements such as magnesium and calcium, and other light-metals such as aluminum. Since the effects of the present technology are expected to be achieved independently of the kind of the electrode reactant, similar effects are achievable, even if the kind of the electrode reactant is changed.

Note that the effects described in the present specification are illustrative and non-limiting. The present technology may have effects other than those described in the present specification.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

It is to be noted that the present technology may have the following configurations.

(1)
A secondary battery, including:
a cathode;
an anode; and
an electrolytic solution including a sulfuric acid compound represented by the following formula (1),
the cathode, the anode, and the electrolytic solution being provided inside a film-like outer package member,

$$X^{n+}[M(Rf)_a(CN)_b(SO_4)_c]^{m-} \quad (1)$$

where $X^{n+}$ is one of a metal ion and an onium ion, M is one of transition metal elements, and Group 13 elements, Group 14 elements, and Group 15 elements in the long form of the periodic table of the elements, Rf is one of a fluorine group (—F) and a monovalent fluorinated hydrocarbon group, a is an integer of 0 to 4, b is an integer of 0 to 5, c is an integer of 1 to 4, m is an integer of 1 to 3, and n is an integer of 1 or 2.

(2)
The secondary battery according to (1), in which the X is one of Group 1 elements and Group 2 elements in the long form of the periodic table of the elements.

(3)
The secondary battery according to (1) or (2), in which the X1 is lithium (Li).

(4)
The secondary battery according to any one of (1) to (3), in which the M is one of boron (B), phosphorus (P), and aluminum (Al).

(5)
The secondary battery according to any one of (1) to (4), in which the monovalent fluorinated hydrocarbon group is a group in which one or more hydrogen groups in one of an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound are substituted by a fluorine group.

(6)
The secondary battery according to any one of (1) to (5), in which
the Rf is a group in which one or more hydrogen groups in an alkyl group are substituted by a fluorine group, and
the number of carbons in the group is from 1 to 10.

(7)
The secondary battery according to any one of (1) to (6), in which a content of the sulfuric acid compound in the electrolytic solution is from 0.01 mol/kg to 1 mol/kg both inclusive.

(8)
The secondary battery according to any one of (1) to (7), in which
the electrolytic solution includes one or more of unsaturated cyclic carbonate esters represented by the following formulas (1), (2), and (3),

[Chem. 13]

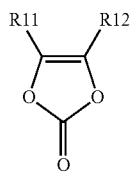
(1)

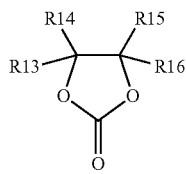
(2)

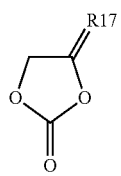
(3)

where each of R11 and R12 is one of a hydrogen group and an alkyl group, each of R13 to R16 is one of a hydrogen group, an alkyl group, a vinyl group, and an allyl group, one or more of R13 to R16 is one of the vinyl group and the allyl group, R17 is a group represented by >CR171R172, and each of R171 and R172 is one of a hydrogen group and an alkyl group.

(9)
The secondary battery according to any one of (1) to (8), in which the electrolytic solution includes one or more of halogenated carbonate esters represented by the following formulas (4) and (5),

[Chem. 14]

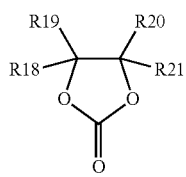
(4)

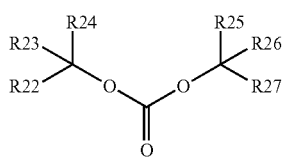
(5)

where each of R18 to R21 is one of a hydrogen group, a halogen group, an alkyl group, and a halogenated alkyl group, one or more of R18 to R21 is one of the halogen group and the halogenated alkyl group, each of R22 to R27 is one of a hydrogen group, a halogen group, an alkyl group, and a halogenated alkyl group, and one or more of R22 to R27 is one of the halogen group and the halogenated alkyl group.

(10) The secondary battery according to any one of (1) to (9), in which the secondary battery is a lithium-ion secondary battery.

(11) A battery pack, including:
the secondary battery according to any one of (1) to (10);
a controller that controls an operation of the secondary battery; and
a switch section that switches the operation of the secondary battery in accordance with an instruction from the controller.

(12) An electric vehicle, including:
the secondary battery according to any one of (1) to (10);
a converter that converts electric power supplied from the secondary battery into drive power;
a drive section that operates in accordance with the drive power; and
a controller that controls an operation of the secondary battery.

(13) An electric power storage system, including:
the secondary battery according to any one of (1) to (10);
one or more electric devices that are supplied with electric power from the secondary battery; and
a controller that controls the supplying of the electric power from the secondary battery to the one or more electric devices.

(14) An electric power tool, including:
the secondary battery according to any one of (1) to (10); and
a movable section that is supplied with electric power from the secondary battery.

(15) An electronic apparatus including the secondary battery according to any one of (1) to (10) as an electric power supply source.

The present application is based on and claims priority from Japanese Patent Application No. 2015-026729 filed in the Japan Patent Office on Feb. 13, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A secondary battery, comprising:
a cathode;
an anode; and
an electrolytic solution including a sulfuric acid compound represented by the following formula (1),
the cathode, the anode, and the electrolytic solution being provided inside a film-like outer package member,

$$X^{n+}[M(Rf)_a(CN)_b(SO_4)_c]^{m-} \quad (1)$$

where $X^{n+}$ is one of a metal ion and an onium ion, M is one of transition metal elements, and Group 13 elements, Group 14 elements, and Group 15 elements in the long form of the periodic table of the elements, Rf is a monovalent fluorinated hydrocarbon group, a is an integer of 1 to 4, b is an integer of 0 to 5, c is an integer of 1 to 4, m is an integer of 1 to 3, and n is an integer of 1 or 2, wherein the monovalent fluorinated hydrocarbon group is a group in which one or more hydrogen groups in one of an alkyl group, an alkenyl group, an alkynyl group, a cycloalkyl group, an aryl group, and a monovalent group in which two or more of the alkyl group, the alkenyl group, the alkynyl group, the cycloalkyl group, and the aryl group are bound are substituted by a fluorine group.

2. The secondary battery according to claim 1, wherein the X is one of Group 1 elements and Group 2 elements in the long form of the periodic table of the elements.

3. The secondary battery according to claim 1, wherein the X is lithium (Li).

4. The secondary battery according to claim 1, wherein the M is one of boron (B), phosphorus (P), and aluminum (Al).

5. The secondary battery according to claim 1, wherein a content of the sulfuric acid compound in the electrolytic solution is from 0.01 mol/kg to 1 mol/kg both inclusive.

6. The secondary battery according to claim 1, wherein the electrolytic solution includes one or more of unsaturated cyclic carbonate esters represented by the following formulas (1), (2), and (3),

[Chem. 1]

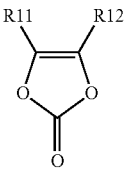

(1)

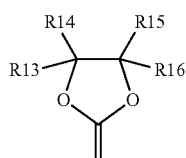

(2)

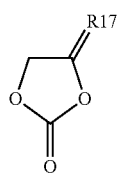

(3)

where each of R11 and R12 is one of a hydrogen group and an alkyl group, each of R13 to R16 is one of a hydrogen group, an alkyl group, a vinyl group, and an allyl group, one or more of R13 to R16 is one of the vinyl group and the allyl group, R17 is a group represented by >CR171R172, and each of R171 and R172 is one of a hydrogen group and an alkyl group.

7. The secondary battery according to claim 1, wherein the electrolytic solution includes one or more of halogenated carbonate esters represented by the following formulas (4) and (5),

[Chem. 2]

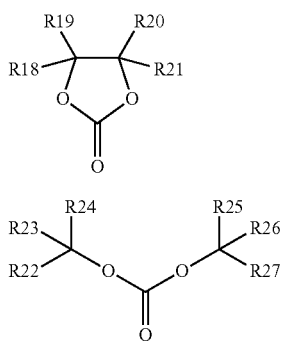

(4)

(5)

where each of R18 to R21 is one of a hydrogen group, a halogen group, an alkyl group, and a halogenated alkyl group, one or more of R18 to R21 is one of the halogen group and the halogenated alkyl group, each of R22 to R27 is one of a hydrogen group, a halogen group, an alkyl group, and a halogenated alkyl group, and one or more of R22 to R27 is one of the halogen group and the halogenated alkyl group.

8. The secondary battery according to claim 1, wherein the secondary battery is a lithium-ion secondary battery.

9. A battery pack, comprising:
the secondary battery according to claim 1;
a controller that controls an operation of the secondary battery; and
a switch section that switches the operation of the secondary battery in accordance with an instruction from the controller.

10. An electric vehicle, comprising:
the secondary battery according to claim 1;
a converter that converts electric power supplied from the secondary battery into drive power;
a drive section that operates in accordance with the drive power; and
a controller that controls an operation of the secondary battery.

11. An electric power storage system, comprising:
the secondary battery according to claim 1;
one or more electric devices that are supplied with electric power from the secondary battery; and
a controller that controls the supplying of the electric power from the secondary battery to the one or more electric devices.

12. An electric power tool, comprising:
the secondary battery according to claim 1; and
a movable section that is supplied with electric power from the secondary battery.

13. An electronic apparatus comprising the secondary battery according to claim 1 as an electric power supply source.

14. A secondary battery, comprising:
a cathode;
an anode; and
an electrolytic solution including a sulfuric acid compound represented by the following formula (1),
the cathode, the anode, and the electrolytic solution being provided inside a film-like outer package member, $$X^{n+}[M(Rf)_a(CN)_b(SO_4)_c]^{m-} \quad (1)$$

where $X^{n+}$ is one of a metal ion and an onium ion, M is one of transition metal elements, and Group 13 elements, Group 14 elements, and Group 15 elements in the long form of the periodic table of the elements, Rf is a group in which one or more hydrogen groups in an alkyl group are substituted by a fluorine group, and the number of carbons in the group is from 1 to 10, where a is an integer of 1 to 4, b is an integer of 0 to 5, c is an integer of 1 to 4, m is an integer of 1 to 3, and n is an integer of 1 or 2.

15. The secondary battery according to claim 14, wherein the X is one of Group 1 elements and Group 2 elements in the long form of the periodic table of the elements.

16. The secondary battery according to claim 14, wherein the X is lithium (Li).

17. The secondary battery according to claim 14, wherein the M is one of boron (B), phosphorus (P), and aluminum (Al).

18. The secondary battery according to claim 14, wherein the secondary battery is a lithium-ion secondary battery.

19. A battery pack, comprising:
the secondary battery according to claim 14;
a controller that controls an operation of the secondary battery; and
a switch section that switches the operation of the secondary battery in accordance with an instruction from the controller.

20. An electric vehicle, comprising:
the secondary battery according to claim 14;
a converter that converts electric power supplied from the secondary battery into drive power;
a drive section that operates in accordance with the drive power; and
a controller that controls an operation of the secondary battery.

21. An electric power storage system, comprising:
the secondary battery according to claim 14;
one or more electric devices that are supplied with electric power from the secondary battery; and
a controller that controls the supplying of the electric power from the secondary battery to the one or more electric devices.

22. An electric power tool, comprising:
the secondary battery according to claim 14; and
a movable section that is supplied with electric power from the secondary battery.

23. An electronic apparatus comprising the secondary battery according to claim 14 as an electric power supply source.

* * * * *